United States Patent [19]
Fell et al.

[11] Patent Number: 6,014,637
[45] Date of Patent: Jan. 11, 2000

[54] OBJECT ORIENTED FRAMEWORK MECHANISM FOR FULFILLMENT REQUIREMENTS MANAGEMENT

[75] Inventors: Kathryn Anne Fell, Zumbro Falls; Nancy Mae Heinz, Rochester; William Robert Taylor, Rochester; Gary V. Tollers, Rochester, all of Minn.

[73] Assignee: International Business Machines Corporation, Armonk, N.Y.

[21] Appl. No.: 08/846,921

[22] Filed: Apr. 30, 1997

[51] Int. Cl.[7] .................................................. G06F 17/60
[52] U.S. Cl. ................................... 705/26; 705/1; 705/7; 707/103
[58] Field of Search ................................. 705/26, 7, 8, 9, 705/10; 707/103, 104

[56] References Cited

U.S. PATENT DOCUMENTS

| | | | |
|---|---|---|---|
| 4,943,932 | 7/1990 | Lark et al. | 706/60 |
| 5,057,996 | 10/1991 | Cutler et al. | 395/676 |
| 5,101,364 | 3/1992 | Davenport et al. | 345/328 |
| 5,119,475 | 6/1992 | Smith et al. | 345/353 |
| 5,181,162 | 1/1993 | Smith et al. | 707/530 |
| 5,195,172 | 3/1993 | Elad et al. | 706/62 |
| 5,226,161 | 7/1993 | Khoyi et al. | 395/650 |
| 5,247,693 | 9/1993 | Bristol | 395/705 |
| 5,249,270 | 9/1993 | Stewart et al. | 395/200.52 |
| 5,257,384 | 10/1993 | Farrand et al. | 395/285 |

(List continued on next page.)

OTHER PUBLICATIONS

"Object–Oriented Information Systems: Planning and Implementation", by David A. Taylor, Copyright 1992, John Wiley & Sons, Inc, 1992.

"Design Guidelines for 'Tailorable' Frameworks", by Serge Demeyer, et al, Communications of the ACM, vol. 40, No. 10, pp. 60–64, Oct. 1997.

"Frameworks = (Components + Patterns", by Ralph E. Johnson, Communications of the ACM, vol. 40, No. 10, pp. 39–42, Oct. 1997.

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

(List continued on next page.)

*Primary Examiner*—Emanuel Todd Voeltz
*Assistant Examiner*—Thomas A. Dixon
*Attorney, Agent, or Firm*—Martin & Associates, L.L.C.; Derek P. Martin

[57] ABSTRACT

An object oriented framework mechanism for fulfillment requirements management provides an infrastructure that embodies the steps necessary to manage and coordinate information throughout a given fulfillment requirements process, such as coordinating product information from the marketing of products to the ordering of products to the production of products. Certain core functions are provided by the framework, which interact with extensible functions provided by the framework consumer. The architecture of the framework allows a user to determine the conditions and parameters that apply to the specific environment while allowing a programmer to interact with the framework with an interface that is consistent regardless of the specific combination of parameters specified in the fulfillment requirements manager. The extensible functions allow new fulfillment requirements environments to be easily implemented using the framework. The framework thus allows a common programming interface for fulfillment requirements managers implemented using the framework, which may be easily customized to include new or changed parameters. The framework greatly simplifies the programmer's job of developing an end-to-end system by providing a common programming interface, and by providing established classes that may be easily extended to implement the desired fulfillment requirements environment.

76 Claims, 24 Drawing Sheets

U.S. PATENT DOCUMENTS

| | | | |
|---|---|---|---|
| 5,261,080 | 11/1993 | Khoyi et al. | 395/500 |
| 5,274,572 | 12/1993 | O'Neill et al. | 702/57 |
| 5,276,775 | 1/1994 | Meng | 706/51 |
| 5,287,447 | 2/1994 | Miller et al. | 345/342 |
| 5,293,470 | 3/1994 | Birch et al. | 345/435 |
| 5,297,283 | 3/1994 | Kelly, Jr. et al. | 395/674 |
| 5,315,703 | 5/1994 | Matheny et al. | 345/507 |
| 5,367,633 | 11/1994 | Matheny et al. | 345/514 |
| 5,369,570 | 11/1994 | Parad | 364/401 |
| 5,369,766 | 11/1994 | Nakano et al. | 395/685 |
| 5,379,430 | 1/1995 | Nguyen | 707/3 |
| 5,388,264 | 2/1995 | Tobias, II et al. | 707/103 |
| 5,390,325 | 2/1995 | Miller | 395/183.14 |
| 5,396,626 | 3/1995 | Nguyen | 707/103 |
| 5,398,336 | 3/1995 | Tantry et al. | 395/701 |
| 5,832,459 | 11/1998 | Cameron et al. | 705/26 |

OTHER PUBLICATIONS

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

pg,5

Abstract for WIPO Patent Application No. 94/19740, Goldsmith et al., Sep. 1, 1994, "Framework Processor of Object–Oriented Application".

Abstract from WIPO Patent Application No. WO 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neural Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented Case Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspect Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Bahavior of Aggregate Objects".

Inspec Abstract No. 461931, from Islan et al, 1993, "Uniform Co–Scheduling Using Object–Oriented Design Techniques".
Inspec Abstract No. 4613481, from Thieme et al., 1993, "Schema Integration in Object–Oriented Databases".
Inspec Abstract No. 4603430, from G. Booch, 1994, "Designing an Application Framework".
Inspec Abstract No. 4596323, from Frank et al., 1993, "An Integrated Environment for Designing Object–Oriented Enterprise Models".
Inspec Abstract No. 4593721, Periyasamy et al., 1993, "A Formal Framework for Design and Verification of Robotic Agents".
Inspec Abstract No. 4588839, from L. Fisher, 1992, "Constructing a Class Library for Microsoft Windows".
Inspec Abstract No. 4588834, from G. Olander, 1992, "Chembench: Redesign of a Large Commercial Application Using Object–Oriented Techniques".
Inspec Abstract No. 4566447, from J. Rossazza, 1992, "An Object–Centered Fuzzy Representation".
Inspec Abstract No. 4565630, from Karpovich et al, 1993, "A parallel Object–Oriented Framework for Stencil Algorithms".
Inspec Abstract No. C9402–6150G–002, from Bruegge et al., 1993, "A Framework for Dynamic Program Analyzers".
Inspec Abstract No. 4550414, from Parrish et al., 1993, "Automated Flow Graph–Based Testing of Object–Oriented Software Modules".
Inspec Abstract No. 4540729, from Bailes et al., "The Ecology of Class Refinement".
Inspec Abstract No. 4534334, from Campbell et al., 1991, "A Technique for Documenting the Framework of an Object–Oriented System".
Inspec Abstract No. 4534330, from Istavrinos et al., 1992, "Experiences with an Object–Oriented Mapper for Coherent Distributed Shared Memory".
Inspec Abstract No. 4528985, from Beneventano et al., 1993, "Taxonomic Reasoning with Cycles in LOGIDATA+".
Inspec Abstract No. 4525743, from Hakimzadeh et al., 1993, "Instance Variable Access Locking for Object–Oriented Databases".
Inspec Abstract No. 4512593, from H. Sakai, 1993, "A Method for Contract Design and Delegation in Object Behavior Modeling".
Inspec Abstract No. B9310–6210L–099, "Templates, Types and Classes in Open Distributed Processing", 1993.
Inspec Abstract No. 4459325, from Kesim et al., 1992, "On the Evolution of Objects in a Logic Programming Framework".
Inspec Abstract No. 4447153, from Klein et al., 1992, "An Object–Oriented Framework for Curves and Surfaces".
Inspec Abstract No. 4426852, from Benveniste et al., 1992, "Concurrent Programming Notations in the Object–Oriented Language Arche".
Inspec Abstract No. 4425343, from Demurjian et al., 1993, "Programming Versus Databases in Object–Oriented Paradigm".
Inspec Abstract No. 4417604, from Kraiem et al., 1992, "Mapping of Conceptual Specifications Into Object–Oriented Programs".
Inspec Abstract No. 4417563, from E. Maim, 1992, "Recognizing Objects from Constraints".
Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".
Inspec Abstract No. 4400350, from Y. Shoham, 1993, "Agent–Oriented Programming".
Inspec Abstract No. 4395549, from Hostrom et al., 1992, "Portability and Data Structures in Scientific Computing–Object–Oriented Design of Utility Routings in Fortran".
Inspec Abstract No. 4391388, from Thomas et al., 1992, "A Generic Object–Oriented Concurrency Mechanism for Extensibility and Reuse of Synchronization Components".
Inspec Abstract No. 4387201, from Chu et al., 1992, "A Pattern Based Approach of Integrating Data and Knowledge to Support Cooperative Query Answering".
Inspec Abstract No. 4366189, from Holt et al., 1992, "A Framework for Using Formal Methods in Object–Oriented Software Development".
Inspec Abstract No. 4356300, from Bertino et al., 1993, "Path–Index: An Approach to the Efficient Execution of Object–Oriented Queries".
Inspec Abstract No. 4341376, from Bertino et al., 1992, "Optimization of Object–Oriented Queries Using Path Indices".
Inspec Abstract No. 4331060, from Lau et al., 1992, "An Object–Oriented Class Library for Scalable Parallel Heuristic Search".
Inspec Abstract No. 4318465, from P. Madany, 1992, "Object–Oriented Framework for File Systems".
Inspec Abstract No. 4302722, from Eggenschwiler et al., 1992, "ET++SwapsManager: Using Object Technology in the Financial Engineering Domain".
Inspec Abstract No. 4298324, from S. Nichol, 1992, "Extending Turbo Vision".
Inspec Abstract No. 4297404, from Tanaka et al., 1992, "Two–Level Schemata and Generalized Links for Hypertext Database Models".
Inspec Abstract No. 4287814, from Natarajan et al., 1992, "Issues in Building Dynamic Real–Time Systems".
Inspec Abstract No. 4281362, from Marshall et al., 1991, "Using VDM within an Object–Oriented Framework".
Inspec Abstract No. 4275707, from Tsukamoto et al., 1991, "DOT: A Term Representation Using DOT Algebra for Knowledge–Bases".
Inspec Abstract No. 4275698, from Van den Bussche et al., 1991, "Evaluation and Optimization of Complex Object Selections".
Inspec Abstract No. 4275693, from Giannotti et al., 1991, "Non–Determinism in Deductive Databases".
Inspec Abstract No. 4270361, from Artale et al., 1991, "Introducing Knowledge Representation Techniques in Database Models".
Inspec Abstract No. 4270125, from Becker et al., 1991, "Reusable Object–Oriented Specifications for Decision Support Systems".
Inspec Abstract No. 4258492, from M. Ball, 1992, "Inside Templates: Implementing C++ Strategies".
Inspec Abstract No. 4258051, from Rundensteiner et al., 1992, "Set Operations in Object–Based Data Models".
Inspec Abstract No. 4244023, from George et al., 1991, "An Object–Oriented Data Model to Represent Uncertainty in Coupled Artificial Intelligence–Database Systems".
Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".
Inspec Abstract No. 4117514, from Wuwongse et al., 1991, "An Object–Oriented Approach to Model Management".
Inspec Abstract No. C94204–6110J–017, "Choices, Frameworks and Refinement", R. H. Campbell et al., 1991.
Inspec Abstract No. 4090970, from P. Kougiouris, 1991, "Device Management Framework for an Object–Oriented Operating System".
Inspec Abstract No. 4077440, from A. Mahler, 1991, "Organizing Tools in a Uniform Environment Framework".
Inspec Abstract No. 4067033, from Shaw et al., 1990, "Experience with the ET++ Application Framework".
Inspec Abstract No. 4060084, from Muller et al., 1990, "ODICE: Object–Oriented Hardware Description in CAD Environment".
Inspec Abstract No. 4050569, from Di Giovanni et al., 1990, "HOOD Nets".
Inspec Abstract No. C91072815, from Holtkamp et al, 1990, "DEMOM–A Description Based Media Object Data Model".
Inspec Abstract No. C91072016, from A. Lane, 1991, "/DOS/C++–Application Frameworks".
Inspec Abstract No. C91072574, from Hemery et al., "An Analysis of Communication and Multiprogramming in the Helios Operating System".
Inspec Abstract No. C91064787, from Madany et al, 1989, "A Class Hierarchy for Building Stream–Oriented File Systems".
Inspec Abstract No. C91064580, from Gamma et al., 1989, "Integration of a Programming Environment into ET++–A Case Study".
Inspec Abstract No. C91058815, from Menga et al., 1990 "G++: An Environment for Object Oriented Analysis and Prototyping".
Inspec Abstract No. B91052096, from Cusack et al., 1990, "Object–Oriented Specification in LOTOS and Z, or My Cat Really is Object–Oriented!".
Inspec Abstract No. C91053475, from Queinnec et al., 1988, "An Open Ended Data Representation Model for EU–LISP".
Inspec Abstract No. C91053151, from E. Cusack, 1991, "Refinement, Conformance and Inheritance".
Inspec Abstract No. C91042802, from T. Yokoyama, 1990, "An Object–Oriented and Constraint–Based Knowledge Representation System for Design Object Modeling".
Inspec Abstract No. C91041980, from Choi et al., 1991, "Graph Interpretation of Methods: A Unifying Framework for Polymorphism in Object–Oriented Programming".
Inspec Abstract No. C91042655, from Q. Li, 1991, "Extending Semantic Object Model: Towards More Unified View of Information Objects".
Inspec Abstract No. C91024852, from Pierra et al., 1990, "An Object Oriented Approach to Ensure Portability of CAD Standard Parts Libraries".
Inspec Abstract No. C91010951, from T. Helton, 1990, "Level5 Object".
Inspec Abstract No. B90075006, from Gossain et al., 1989, "Designing a Class Hierarchy for Domain Representation and Reusability".

Inspec Abstract No. C91003397, from J. Muys–Vasovic, 1989, "MacApp: An Object–Oriented Application Framework".
Inspec Abstract No. C91004708, from Bertino et al., 1990, "Optimization of Queries Using Nested Indices".
Inspec Abstract No. C90052277, from I. Tervonen, 1990, "Object–Oriented Development as a Multiview Software Construction Methodology".
Inspec Abstract No. C90052627, from Schrefl et al., 1988, "A Knowledge–Based Approach to Overcome Structural Differences in Object Oriented Database Integration".
Inspec Abstract No. C90047457, from Yokoyama et al., 1990, "A Constraint–Based and Object–Oriented Knowledge Representation".
Inspec Abstract No. C90034818, from Q. Chen, 1988, "Extending the Object–Oriented Paradigm for Supporting Complex Objects".
Inspec Abstract No. C90030609, from Forde et al., 1990, "Object–Oriented Finite Element Analysis".
Inspec Abstract No. C90007733, from Weinand et al., 1989, "Design and Implementation of ET++, A Seamless Object–Oriented Application Framework".
Inspec Abstract No. C89062837, from Pasquier–Boltuck et al., 1988, "Prototyping an Interactive Electronic Book System Using an Object–Oriented Approach".
Inspec Abstract No. C89056727, from Campbell et al., 1989, "Principles of Object–Oriented Operating System Design".
Inspec Abstract No. C89056859, from Hull et al, 1989, "On Accessing Object–Oriented Databases: Expressive Power, Complexity, and Restrictions".
Inspec Abstract No. C89049257, from Madany et al., 1989, "Class Hierarchy for Building Stream–Oriented File Systems".
Inspec Abstract No. C89039001, from Brophy et al., 1989, "A Framework for Multiple, Concurrent Graphical Representation".
Inspec Abstract No. C89033226, from Corradi et al., 1988, "PO: An Object Model to Epxress Parallelism".
Inspec Abstract No. C89014870, from R. King, 1988, "Semantic and Object–Oriented Database Support for Software Environments".
Inspec Abstract No. C89003142, from Tenma et al., 1986, "A System for Generating Language–Oriented Editors".
Inspec Abstract No. C88013915, from Woelk et al., 1987, "Multimedia Information Management in an Object–Oriented Database System".
Inspec Abstract No. C88007447, from P. Allen, 1987, "A Framework for Implementing Multisensor Robotic Tasks".
Inspec Abstract No. C87007043, from Whitted et al., 1986, "Exploiting Classes in Modeling and Display Software".
Inspec Abstract No. C86039588, from K. Fukunaga., 1985; "Prompter: A Knowledge Based Support Tool for Code Understanding".
Inspec Abstract No. C86024804, from Greenspan et al., 1986, "A Requirements Modeling Language and Its Logic".
Inspec Abstract No. C84005713, from Meyer et al., 1983, "Towards a Two–Dimensional Programming Environment".
Inspec Abstract No. C81005505, from Mylopoulos et al., 1980, "Some Features of the TAXIS Data Model".

Zoo Administrator

(from Zoo Administration)

5_minute_timer()
add/delete_animal()
add/delete_containment_unit()
add/delete_zoo_keeper()
start_zoo_admin()

Containment Unit
(from Containment
Unit Mechanism)
adjust_temp()

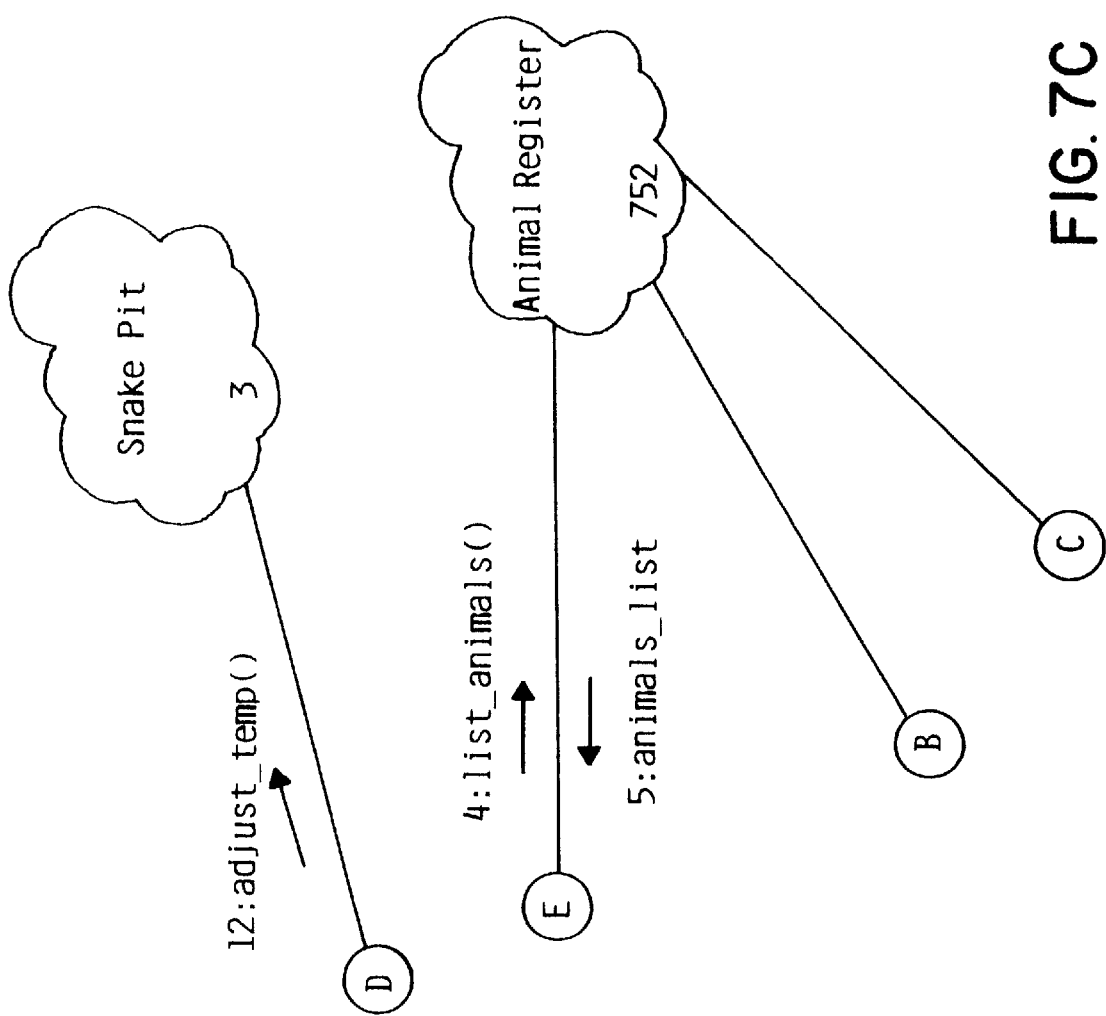

OBJECT ORIENTED FRAMEWORK MECHANISM FOR FULFILLMENT REQUIREMENTS MANAGEMENT

BACKGROUND OF THE INVENTION

1. Technical Field

The present invention relates in general to the data processing field. More specifically, the present invention relates to the field of Object Oriented framework mechanisms.

2. Related Art

The development of the EDVAC computer system of 1948 is often cited as the beginning of the computer era. Since that time, computer systems have evolved into extremely sophisticated devices, including complex combinations of hardware and software. Computer systems have been applied to a host of different applications. One such application is fulfillment requirements management, which describes the coordination of products offered, product availability, and order processing to get a product from the offering stage to a consumer through final delivery of the product to the consumer.

One example of an environment that typically uses a computer system to track and control products and orders is in the manufacturing of computer systems. Modern computer systems are relatively modular. Building a computer system requires assembling various hardware components together and loading various software components into the system, typically by installing the software components on a hard disk drive. A great number of different configurations are possible due to the large number of hardware and software components that may be provided. This results in a relatively complex manufacturing environment that must be able to accommodate the many possible computer configurations.

In most modern manufacturing environments, multiple software applications are used to support the fulfillment requirements of configurable products. This means that the configuration options and relationships are typically programmed in multiple different languages using multiple programming tools. As a result, information that needs to be communicated between different software applications in the order and product delivery system has been typically related in paper documents.

Using paper documents to relate information between software applications is inefficient, time-consuming, and prone to human errors. Information on a paper document may require entering the information in multiple different software applications. Document authors often omit details that may seem "obvious", leaving application developers to guess at the missing details. Each time the information is keyed in by a human operator, errors may result. In addition, the entry of the information into the software applications may become a bottleneck to system performance.

The lack of coordination of information between marketing a product to a consumer through processing the order and delivering a product that complies with the order yields great inefficiencies in industry today. Without a mechanism that allows these different software applications to communicate and share data, industry will never fully realize the benefits of computer automation in marketing through the production of products.

DISCLOSURE OF INVENTION

According to the present invention, an object oriented framework mechanism for fulfillment requirements management provides an infrastructure that embodies the steps necessary to manage and coordinate information throughout a given fulfillment requirements process, such as coordinating product information from the marketing of products to the ordering of products to the production of products. Certain core functions are provided by the framework, which interact with extensible functions provided by the framework consumer. The architecture of the framework allows a user to determine the conditions and parameters that apply to the specific environment while allowing a programmer to interact with the framework with an interface that is consistent regardless of the specific combination of parameters specified in the fulfillment requirements manager. The extensible functions allow new fulfillment requirements environments to be easily implemented using the framework. The framework thus allows a common programming interface for fulfillment requirements managers implemented using the framework, which may be easily customized to include new or changed parameters. The framework greatly simplifies the programmer's job of developing an end-to-end system by providing a common programming interface, and by providing established classes that may be easily extended to implement the desired fulfillment requirements environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

BRIEF DESCRIPTION OF THE DRAWINGS

FIGS. 2 through 6 are class diagrams for the example framework mechanism of FIG. 1;

DESCRIPTION OF THE PREFERRED EMBODIMENTS

Overview—Object-Oriented Technology

Figure 1:
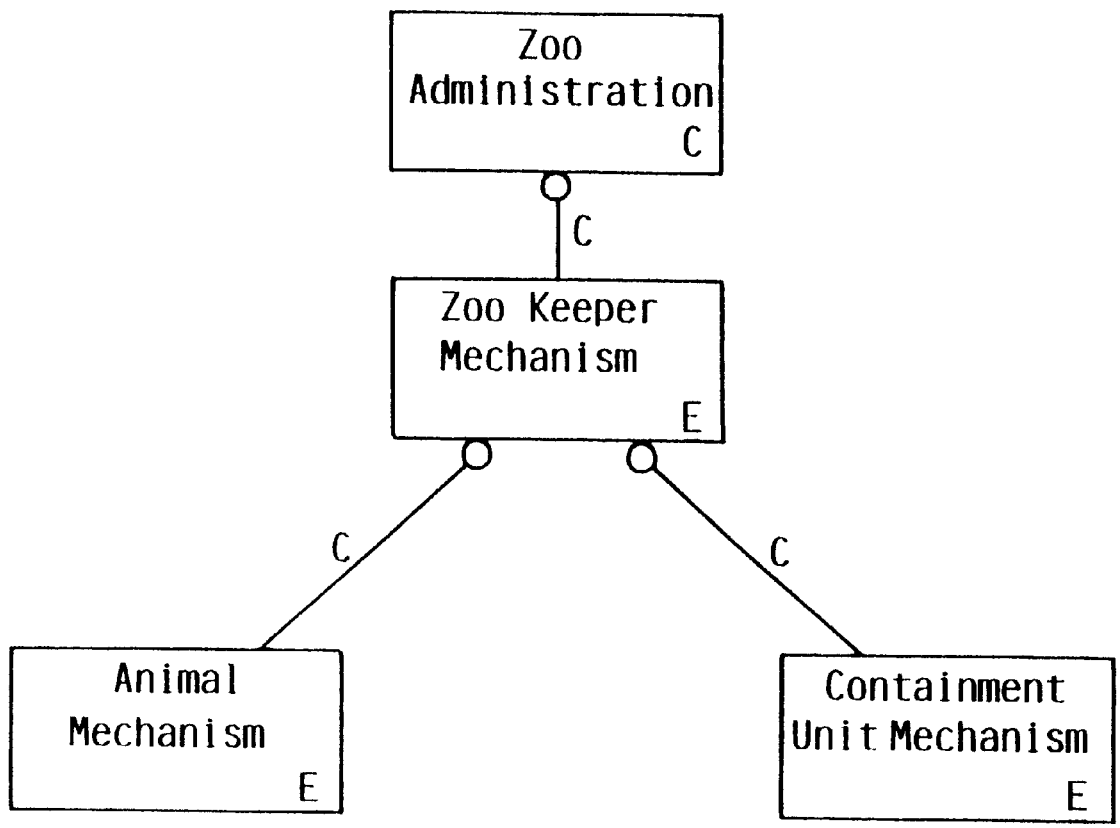
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 20–25). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
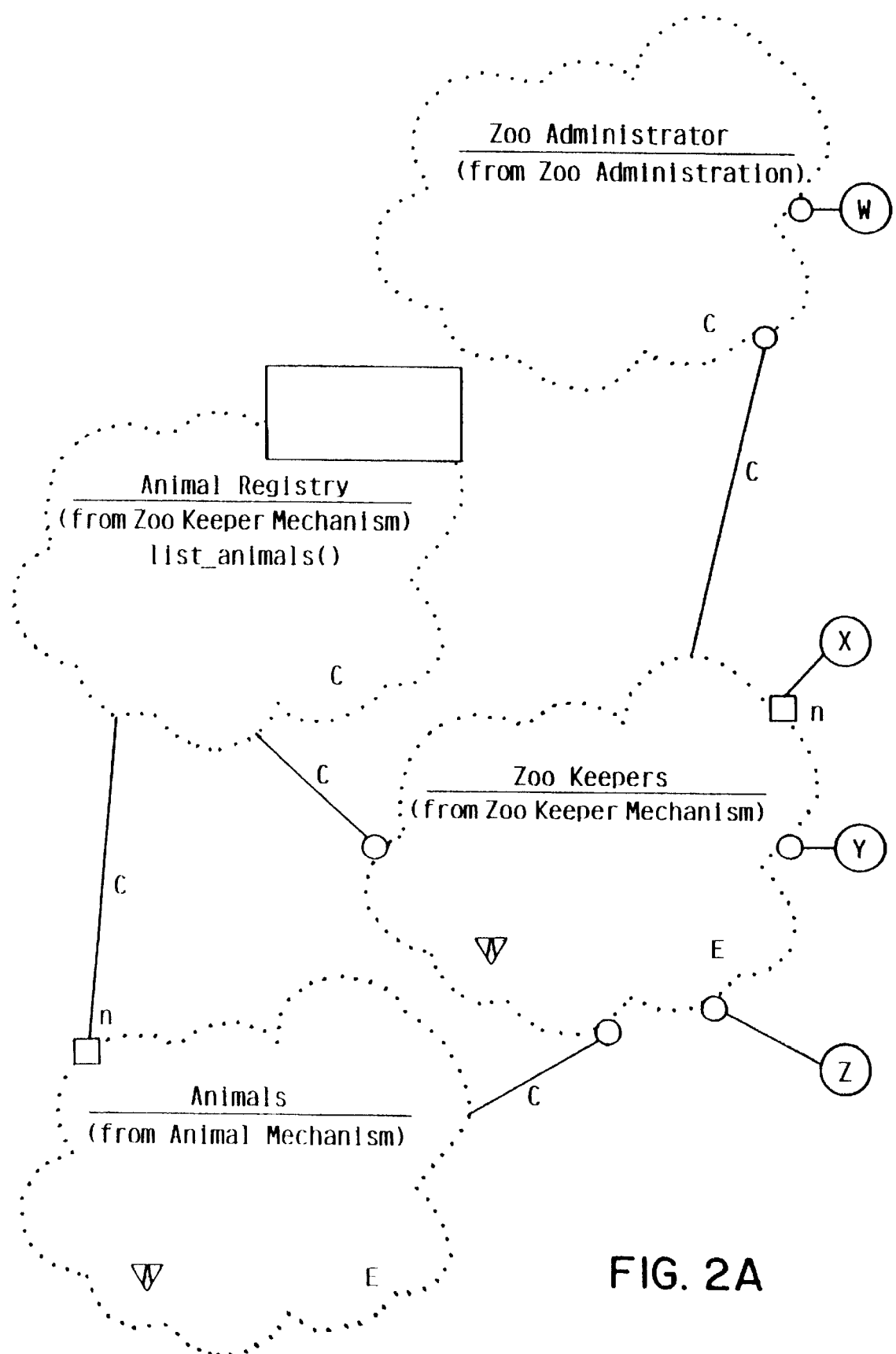
Figure 2B:
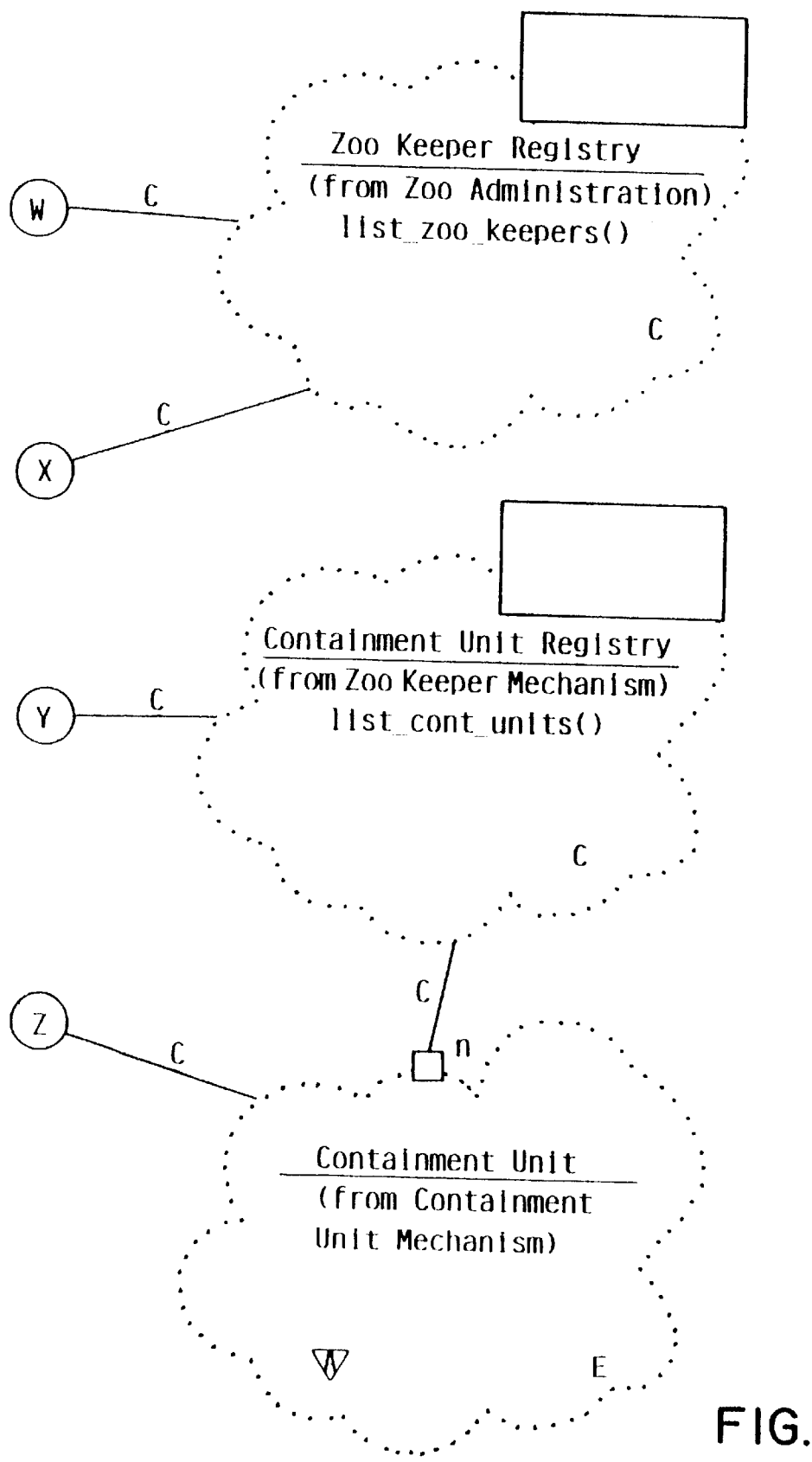

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

FIG. 3 shows a lower level view of the zoo administrator class. Since objects of type zoo administrator hare responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes.

Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
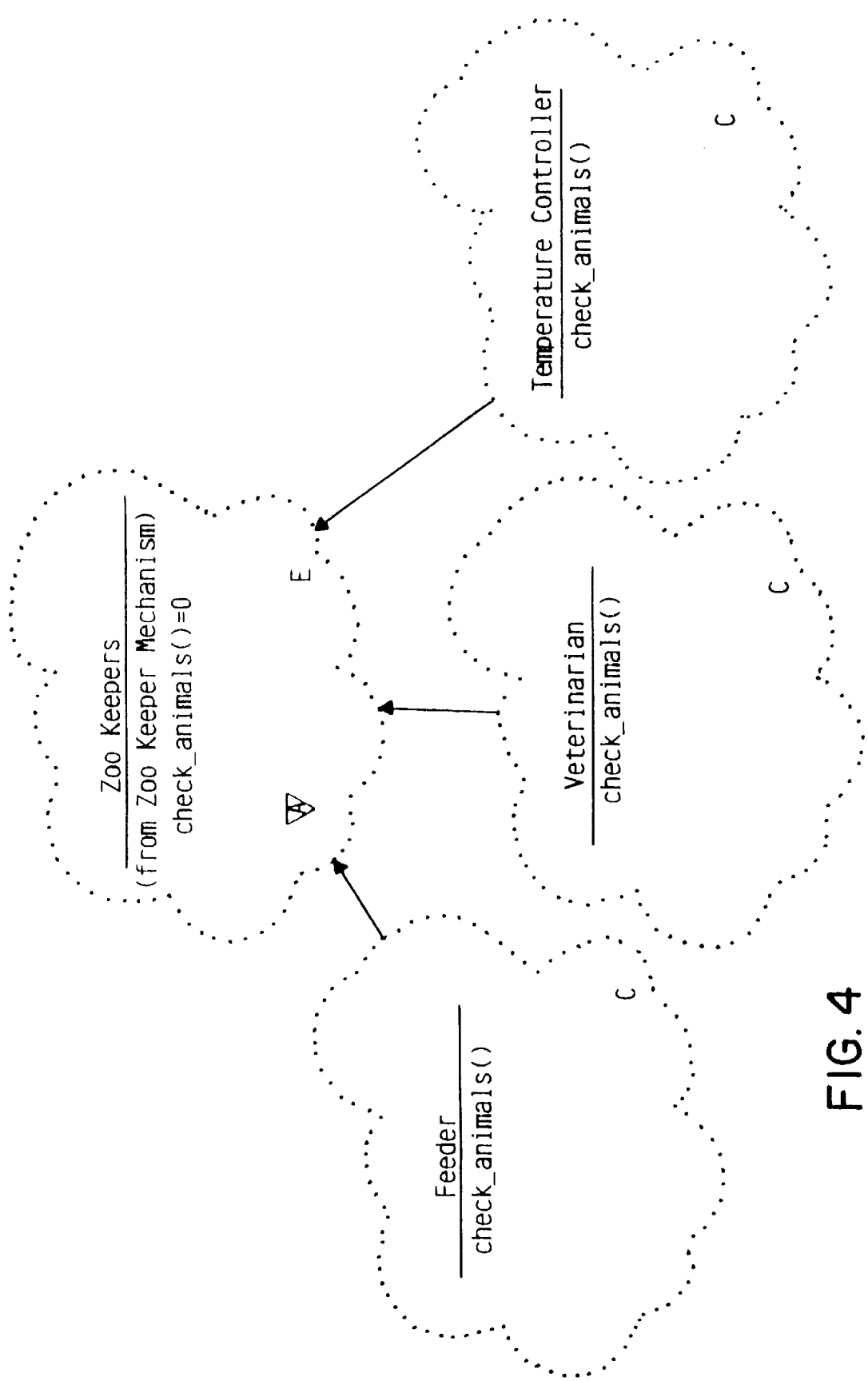

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this ease). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
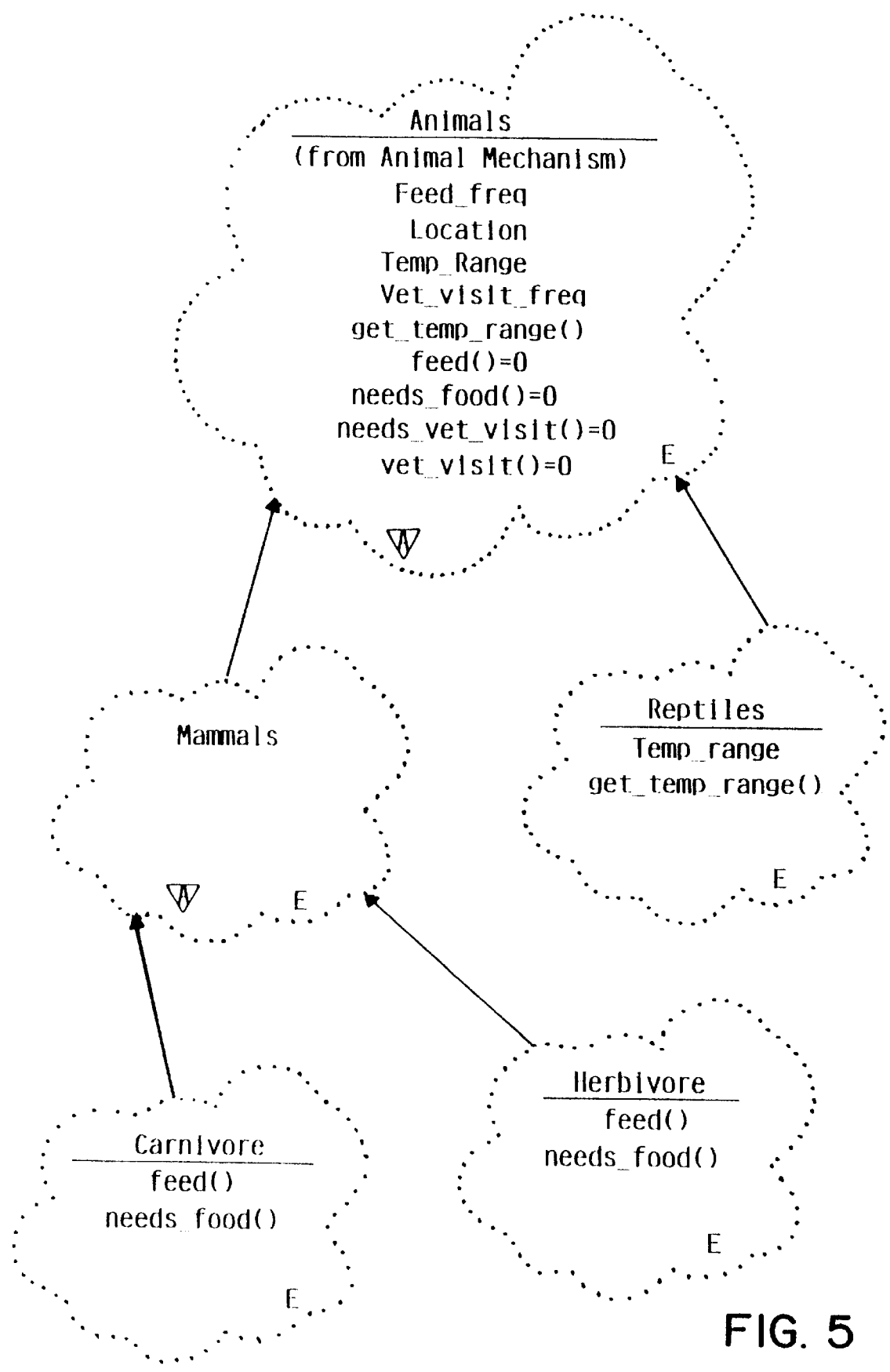

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the $temp_{13}$ range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
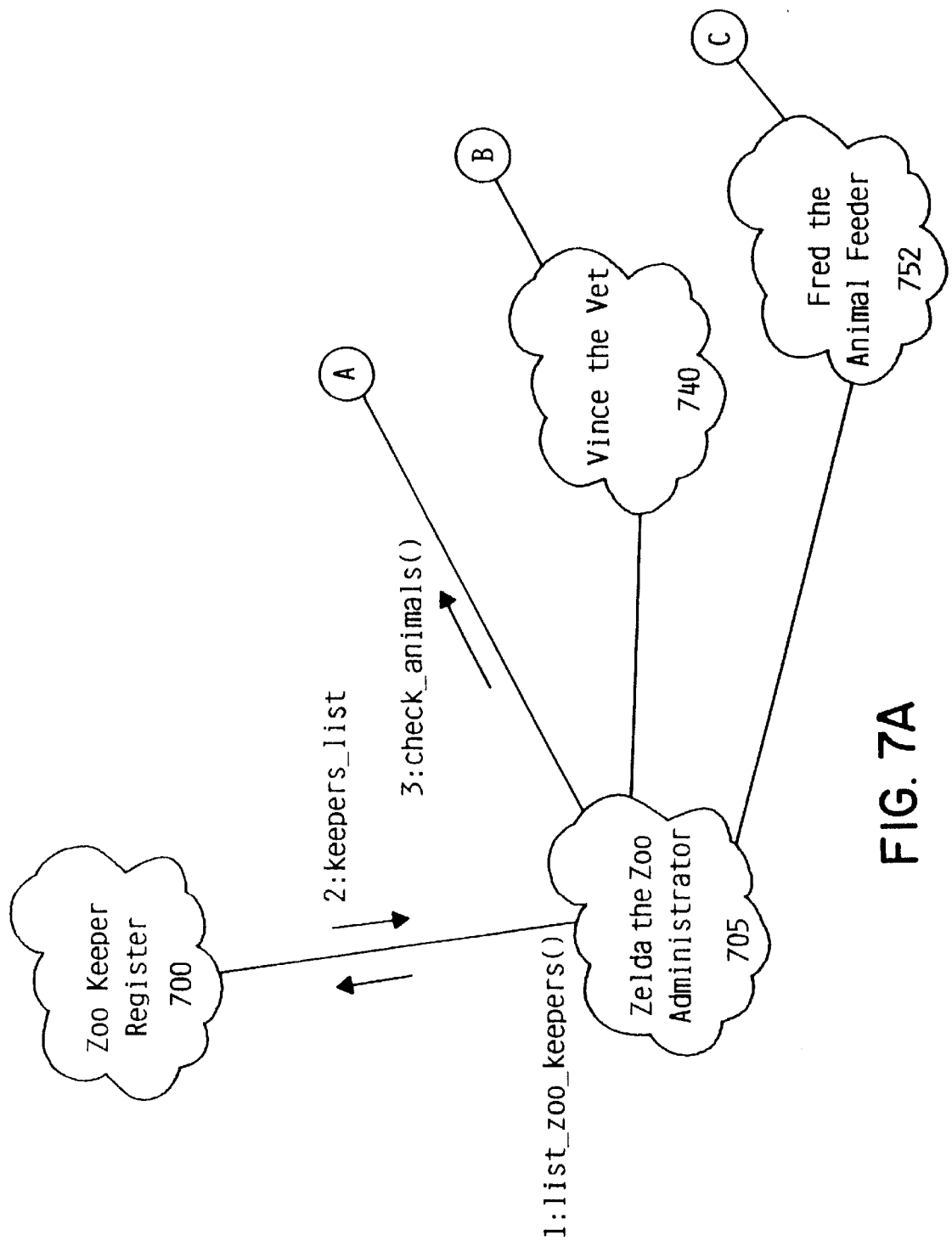
FIG. 7 is an object diagram for the example framework mechanism of FIGS. 1 through 6.
Figure 7B:
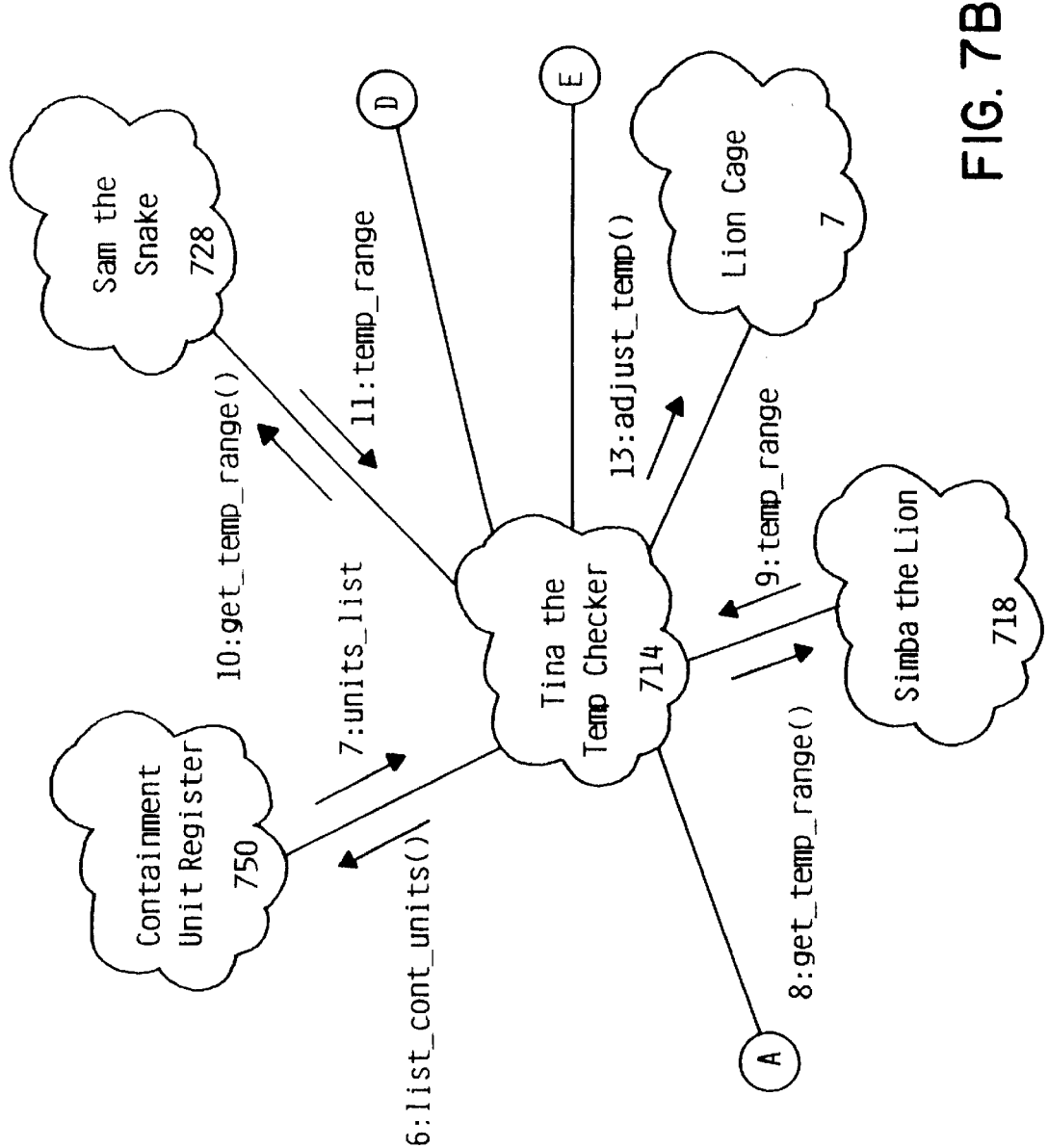

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animal( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust_temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the Detailed Description section below.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is an entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of both object diagrams (for the ZAF example) and interaction diagrams (for the description of the invention), and those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

DETAILED DESCRIPTION

Figure 8:
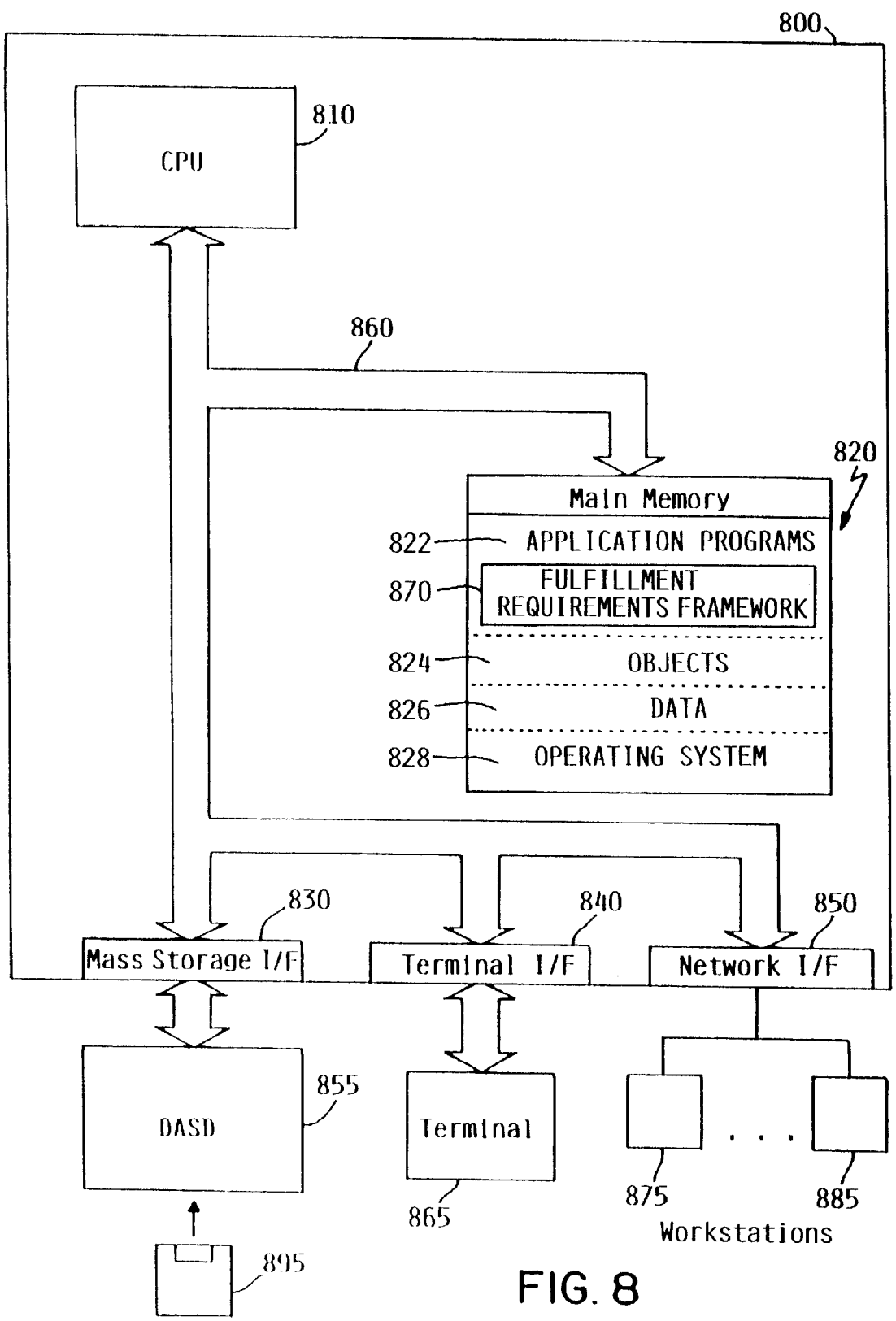
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a fulfillment requirements framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstation, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 895 of FIG. 8) and CD ROMs and transmission type media such as digital and analog communication links.

Fulfillment Requirements Framework Mechanism of the Present Invention

The fulfillment requirements framework mechanism disclosed herein provides an architecture for coordinating data between marketing, order processing, and production as relates to a computer system. Extending the framework to accommodate fulfillment requirements in a specific environment defines a "fulfillment requirements environment." For example, extending the framework to process orders for IBM's AS/400 production line in Rochester, Minn. creates a fulfillment requirements environment that is tailored to the marketing through production information requirements for the AS/400 line.

By providing framework mechanism 870 within computer system 800 to process orders, a uniform interface for all fulfillment requirements systems may be developed. Framework mechanism 870 may replace all of the disjoint proprietary applications that are currently used to perform fulfillment requirements management in modern manufacturing environments. This allows a common user interface for virtually any type of fulfillment requirements system. This common user interface would greatly ease the burden of programming and maintaining custom systems for fulfillment requirements management. Thus, one of the primary benefits of the framework disclosed herein is the capability to manage fulfillment requirements using a simple, easy to use user interface defined by the framework.

Figure 9:
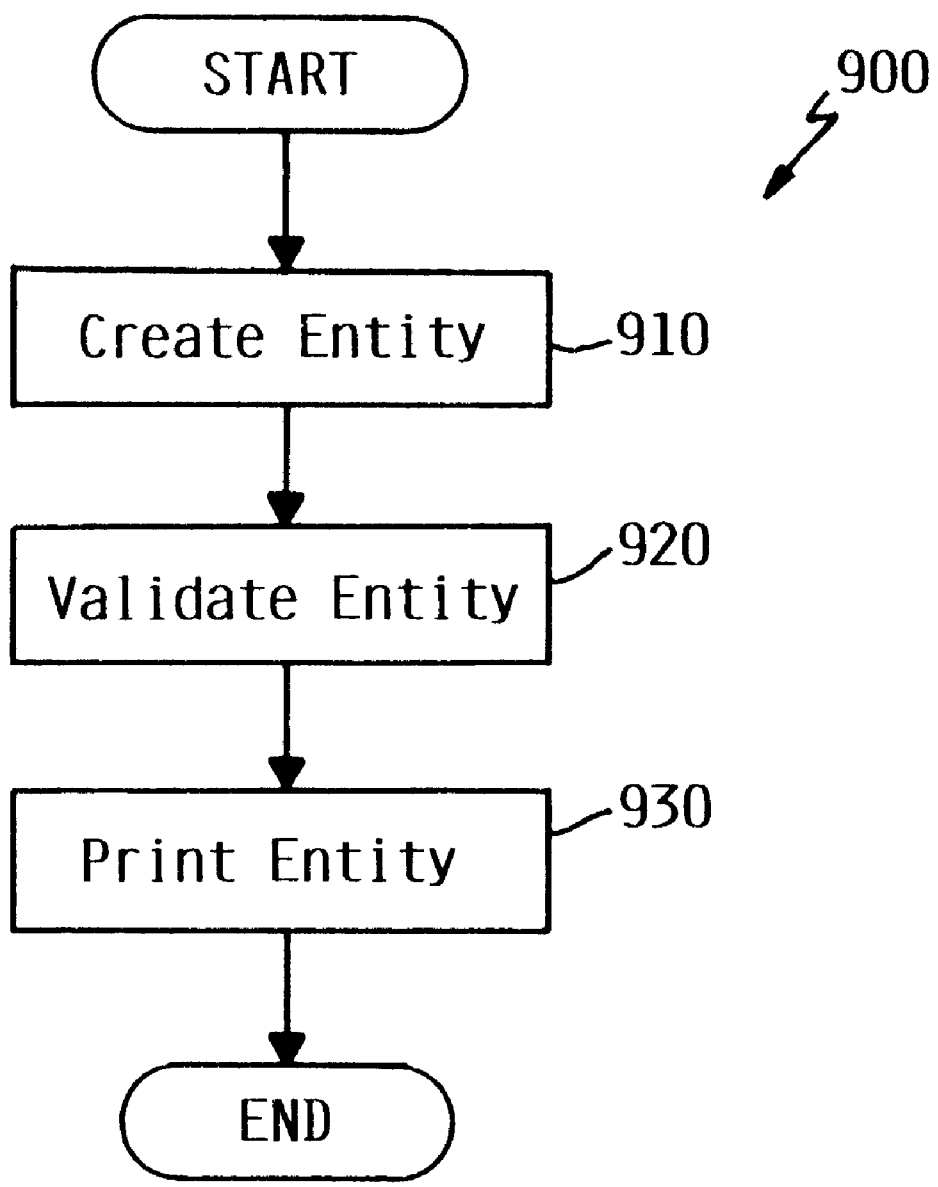
FIG. 9 is a flow diagram showing steps in accordance with the preferred embodiment to perform core functions of the framework mechanism.

Referring to FIG. 9, an example of fulfillment requirements framework 870 in accordance with the preferred embodiment performs steps that comprise a method 900 for performing fulfillment requirements functions in a production environment. The first step is to create the needed entities (step 910). The framework mechanism of the invention may be used for a variety of different entities. Examples of suitable entities include product offerings, orders, and manufacturing items. Each of these entities is an entity that will generally have many other entities associated with it. Next, the entity generated in step 910 is validated (step 920). Finally, the entity is printed, if desired (step 930). Note that method 900 depicts the core function of framework mechanism 870. The detailed function of a particular application that is made from extending framework mechanism 870 depends on the details of the implementation, as will be explained with reference to the specific examples below.

The fact that the preferred embodiment of the framework is object oriented allows the consumer of the framework to easily define the needed functions by subclassing from the classes defined within the framework using known object oriented programming environments, such as C++. The preferred embodiment of the present invention is an object oriented fulfillment requirements framework. While many different designs and implementations are possible, one suitable example of an object oriented fulfillment requirements framework is disclosed below to illustrate the broad concepts of the present invention.

Class Definitions

Figure 10A:
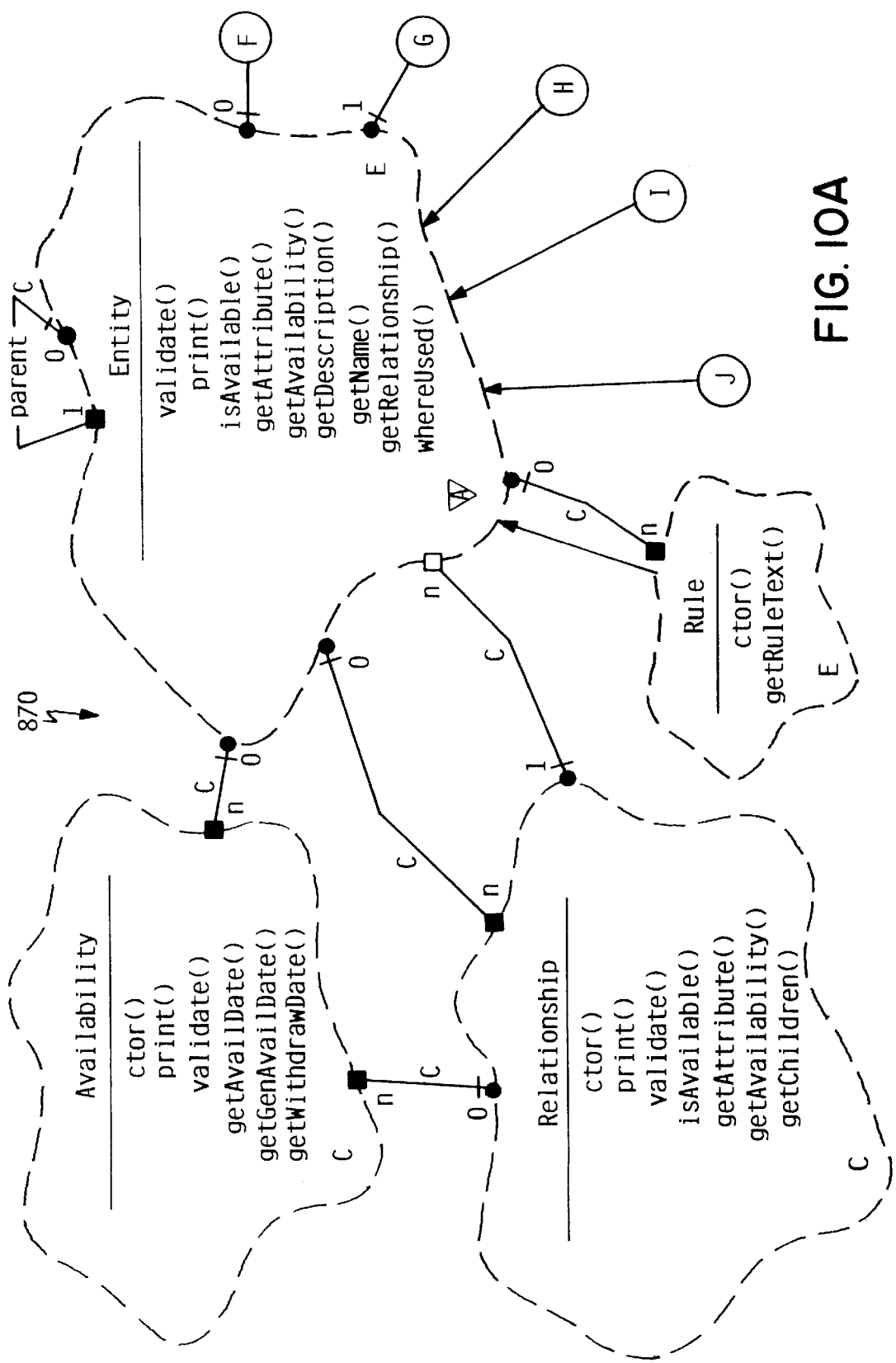
FIG. 10 is a class diagram of a framework mechanism constructed in accordance with the teachings of the preferred embodiment.
Figure 10B:
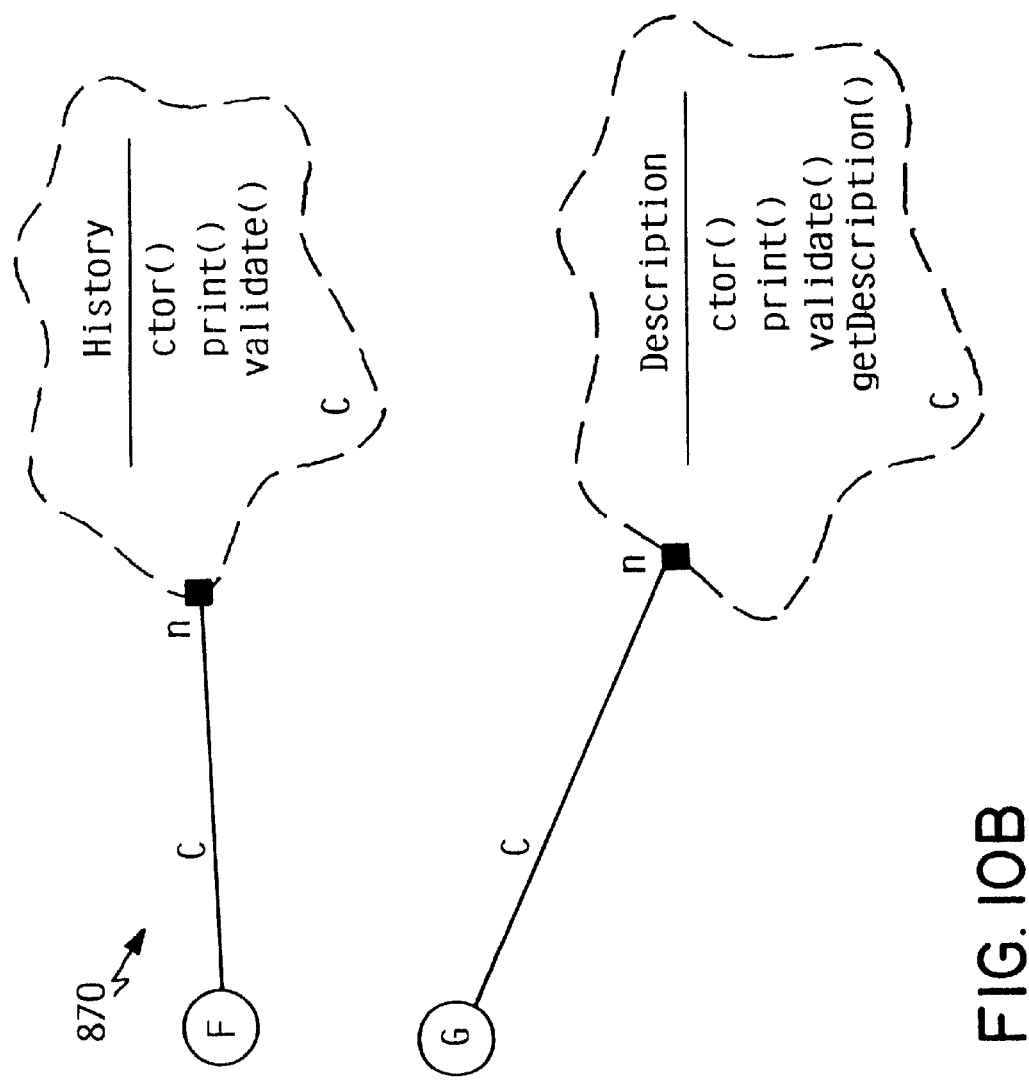
Figure 10C:
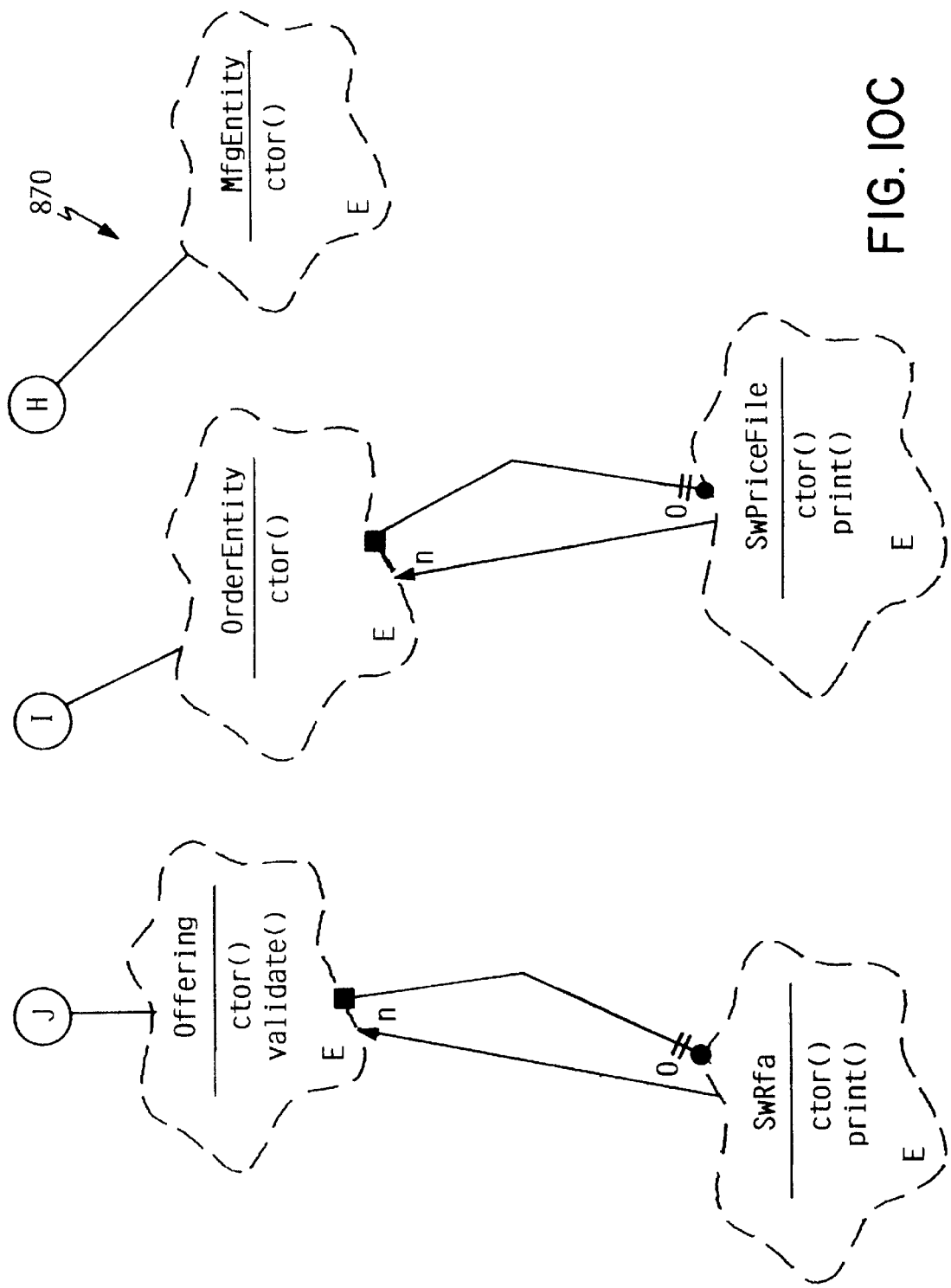

FIG. 10 is a top level class diagram of the classes used to implement fulfillment requirements framework 870. Those skilled in the art will appreciate that the classes illustrated in FIG. 10 encapsulate data attributes and behaviors (or methods). Objects instantiated as members of these classes are stored in the main memory 820 of computer system 800. These classes may be implemented, for example, in a computer system operating environment that supports the C++ programming language. Note that a category diagram is not included for the preferred embodiment because the best mode of the present invention has all the classes in FIG. 1 in a single category.

The base class of interest in framework 870 is the Entity class. Entity is an abstract class that defines multiple methods that are implemented in the concrete subclasses of the entity class. Each of these methods are default methods that simply invoke their corresponding methods on the appropriate objects that are defined by subclasses to implement the desired fulfillment requirements environment. In addition, the Entity class defines attribute data that corresponds to the particular entity implemented in a concrete subclass. This attribute data includes a classification for the entity. Any suitable attributes may be defined by the attribute data, and any suitable classification that applies to the entity may be specified. For example, if the entity is a hard disk drive, it may be classified as hardware and may be further classified as a mass storage device by the classification within the attribute data.

The Entity class is an extensible class of the framework mechanism, as denoted by the "E" label within the class. Each concrete subclass of the Entity class defines different entities that may be accounted for and tracked. Many different subclasses and combinations of subclasses could be defined within the scope of the invention to support a large number of fulfillment requirements environments.

The Entity class has a "contains by value" relationship with each of the Availability class, the Relationship class, the History class, the Description class, and the Rule class, as well as having a "contains by value" relationship with itself. In other words, each entity instantiated under the Entity class or any of its subclasses may contain a Relationship object, an Availability object, a History object, a Description object, a Rule object, and one or more other Entity objects. The Availability class, Relationship class, History class, and Description class are all ore classes of the framework mechanism 870 (denoted by the "C" label within these classes), while the Rule class is an extensible class. Note from the numbers on the "contains by value" relationships that an Entity object may not include an Availability object, a Relationship object, or a History object (0-n), but will always include a Description object (1-n). The Relationship class has a "contains by value" relationship with the Availability class and a "contains by reference" relationship with the Entity class, which means that each object instantiated under the Relationship class may contain from zero to n Availability objects, and that each Relationship object may reference one or more Entity objects.

The methods defined in the Entity class are those that are anticipated to be most commonly needed by entities implemented using the framework. The validate( ) method assures that the attribute data and that the data in the contained objects are valid. The print( ) method extracts out any required information in a desired format. Print in this context is used in its broadest sense, recognizing that the output data may be "printed" to a printer, to a file, may be transferred via network connection to a software program, or may have numerous other definitions that require data to be in a specific format. The isAvailable( ) method is used to determine if the availability object within the entity indicates that the entity is currently available. The getAttribute( ) method is used to determine the attribute data that resides within an entity. The getAvailability( ) method is called to determine the set of availabilities (if any) that apply to a particular entity. For example, a product may be available in one country on a particular date, and in a different country on a different date, so the entity may have multiple availabilities. The getDescription( ) method is called to determine the description contained in the entity. The getName( ) method is called to determine the object name of the entity. The getRelationship( ) method is used to determine what relationships an entity has with other entities. And finally, the whereUsed( ) method is used to determine the context where the entity is used.

The Availability class defines from zero to n objects contained within an entity that indicate when the entity is available. The Availability class includes methods print( ) and validate( ) that perform similar functions as the methods of the same name described above with respect to the Entity class. The ctor( ) method is a constructor method used to instantiate objects under the Availability class. The method getAvailDate( ) is used to get the date that the entity is available. The getGenAvailDate( ) method indicates the date that the entity is generally available. An entity may be have an available date that is earlier than its general available date to allow for marketing, testing, special promotions, etc. The getWithdrawDate( ) method determines the date when an entity will no longer be available (i.e., when it will be withdrawn).

The Relationship class defines from zero to n objects contained within an entity that indicate the relationship of the entity to other entities. The Relationship class includes attribute data that corresponds to the particular relationship implemented in a concrete subclass. This attribute data includes classifications, and the classifications of relationships may include co-requisites, prerequisites, and mutually-exclusive relationships. Two entities are co-requisites if they are needed together. For example, a hard disk drive entity may be a co-requisite with the required cabling for the hard drive, so a relationship between the two may classify them as co-requisites. A first entity is a prerequisite to a second entity if the first entity must be present for the second entity to be present. For example, an expansion card cage would be a suitable prerequisite to any expansion cards in a computer system, and a relationship between the two may classify the card cage as a prerequisite for the expansion card. Two entities may be mutually-exclusive if they cannot exist at the same time. For example, if two different card cages may be placed within a single location in a computer system, these would be mutually exclusive because both cannot physically be placed in the same computer system, and a relationship between the two may classify the two card cages as mutually exclusive entities. These classifications of relationships described above are merely examples of the numerous different types of relationships that may exist among entities within the scope of the present invention.

The Relationship class includes a constructor method ctor( ) that is used to instantiate objects under the Relationship class. The print( ), validate( ), isAvailable( ), and getAttribute( ) methods on the Relationship class perform similar functions as the methods of the same name described above with respect to the Entity class. The getAvailability( ) method on the relationship lass overrides the default getAvailability( ) method defined in the Entity class, and is used to determine the availabilities of the relationship if the relationship is live (i.e., if it meets appropriate selection criteria). In other words, if a relationship meets the selection criteria passed when getAvailability( ) is called, getAvailability( ) will return the availability of the relationship. If the relationship has no availabilities that match the relationship, the relationship is not live, and no relationships are returned. The remaining method getChildren( ) is called to determine the objects that have a relationship with the Relationship class.

The History class defines from zero to n objects contained within an entity that indicate the history of the entity. History information may include when the entity was accessed, when the entity was changed, by whom it was changed, the reasons for the change, etc. The History class has a constructor method ctor( ) to create objects instantiated under the history class, and also has print( ) and validate( ) methods that perform similar functions as the methods of the same name described above with respect to the Entity class.

The Description class defines one or more objects contained within an entity that includes a description of the entity. For example, one description object may include an English name for the entity, while other description objects within the same entity may each include the name for the entity in a different language. The Description class includes a constructor method ctor( ) to create object instantiated under the Description class, and methods print( ), validate( ), and getDescription( ) that perform similar functions as the methods of the same name described above with respect to the Entity class.

The class relationship from the Entity class to itself shows a "contains by value" relationship with the Entity's parent. This means that any attributes, methods, or classes that are contained by a parent Entity class are also contained by subclasses of the parent. Of course, these relationships are subject to being overridden in the subclasses. For example, if a parent Entity object has a particular availability defined by an Availability object that it contains, an entity object instantiated under a subclass of the parent Entity will contain the same availability object, unless overridden by a different availability object. In this manner each Entity may inherit all the useful information of its parent while still providing for complete flexibility through overriding attributes, methods or classes that need to be different from the parent entity.

Examples of suitable entities are shown in FIG. 10, and include a Rule class, an Offering class, an OrderEntity class, and a manufacturing entity (MfgEntity) class. Each of these classes have a constructor method ctor( ) that causes objects under this class to be instantiated. In addition, the Rule class defines a new method getRuleText( ) and the Offering class defines a validate( ) method. Any of the remaining methods in the Entity class that are needed to define a particular type of entity will be implemented in each concrete subclass of Entity. Note that framework mechanism 870 in its broadest sense does not include the Offering, OrderEntity, or MfgEntity classes. Rather, framework mechanism 870 may be used by a framework consumer to describe any entity that may have availabilities, relationships, a history, and a description by appropriate subclassing from the Entity class. However, in accordance with the best mode of the preferred embodiment described herein, framework mechanism 870 suitably includes the Offering, OrderEntity, and MfgEntity classes to allow a framework consumer to easily subclass from these classes to integrate marketing, ordering, and production information in a particular fulfillment requirements environment.

The Rule class defines rules that are presented to a human user. The format for the rules may include text, graphics, audio or video information, etc. Rule objects are themselves entities that may have availability, relationships, history, and description objects, as shown by the Rule class being subclassed from the Entity class. The Rule class includes a constructor method ctor( ) for instantiating objects under the Rule class, and contains one or more other methods that may be used to retrieve rules in suitable format. In the case of this specific example, the Rule class defines text, and a getRuleText( ) method is used to access the rule text.

The Offering class defines product offerings that a customer may purchase. For example, if a customer wants to buy a software program such as the OS/400 operating system, the customer may perceive that they want OS/400 without realizing all the information that may be required to determine which release of OS/400 to supply, with which options, on which media, at what price, etc. All of this required detailed information is specified by the OrderEntity class, which delineates a product that a customer has ordered into the required detailed components. The MfgEntity class represents the final end product that manufacturing will provide in response to the order. For the OS/400 example, the MfgEntity would represent the particular tape reels, CD ROMs, or other media that provide the OS/400 software to the customer.

Figure 14:
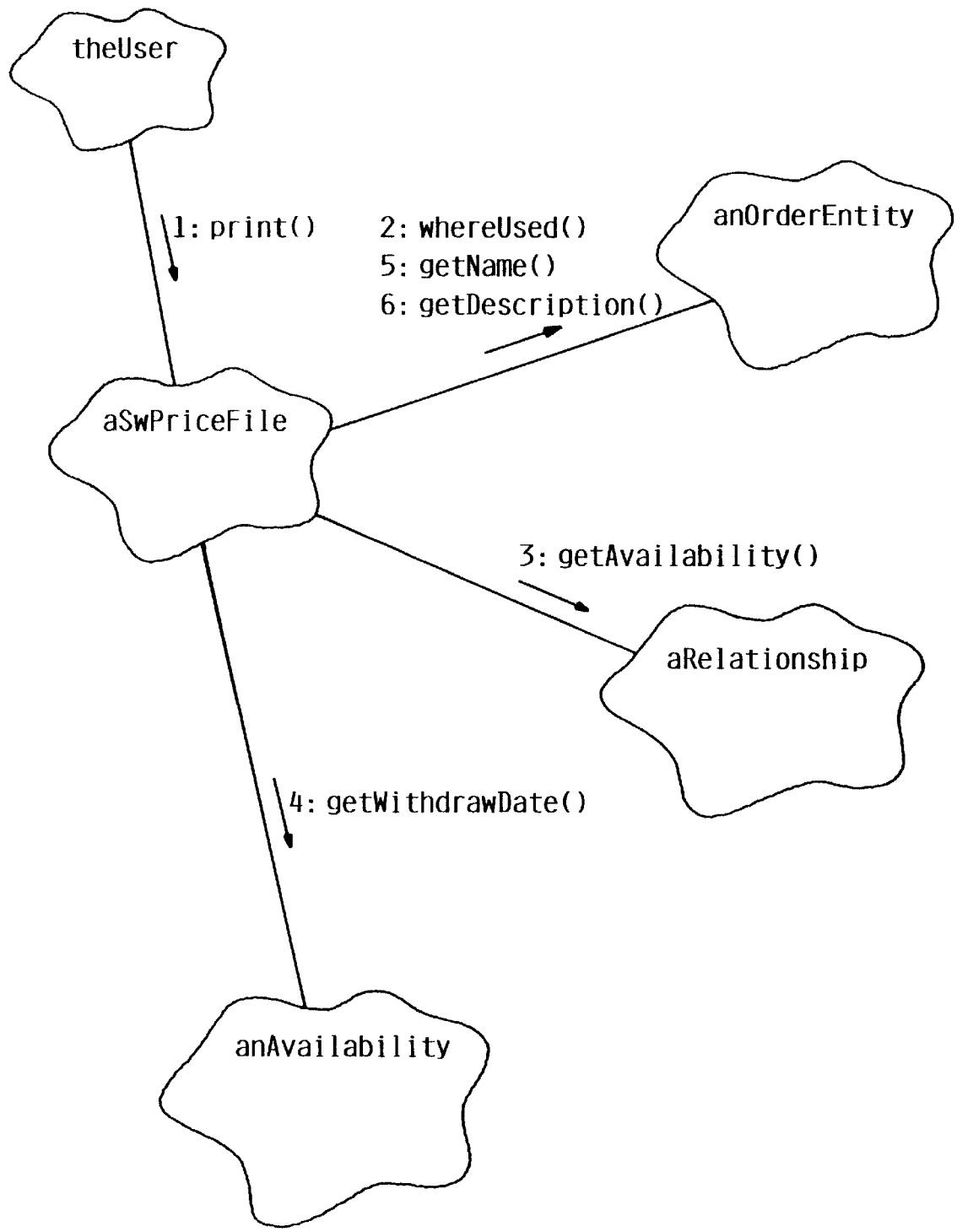
Figure 15A:
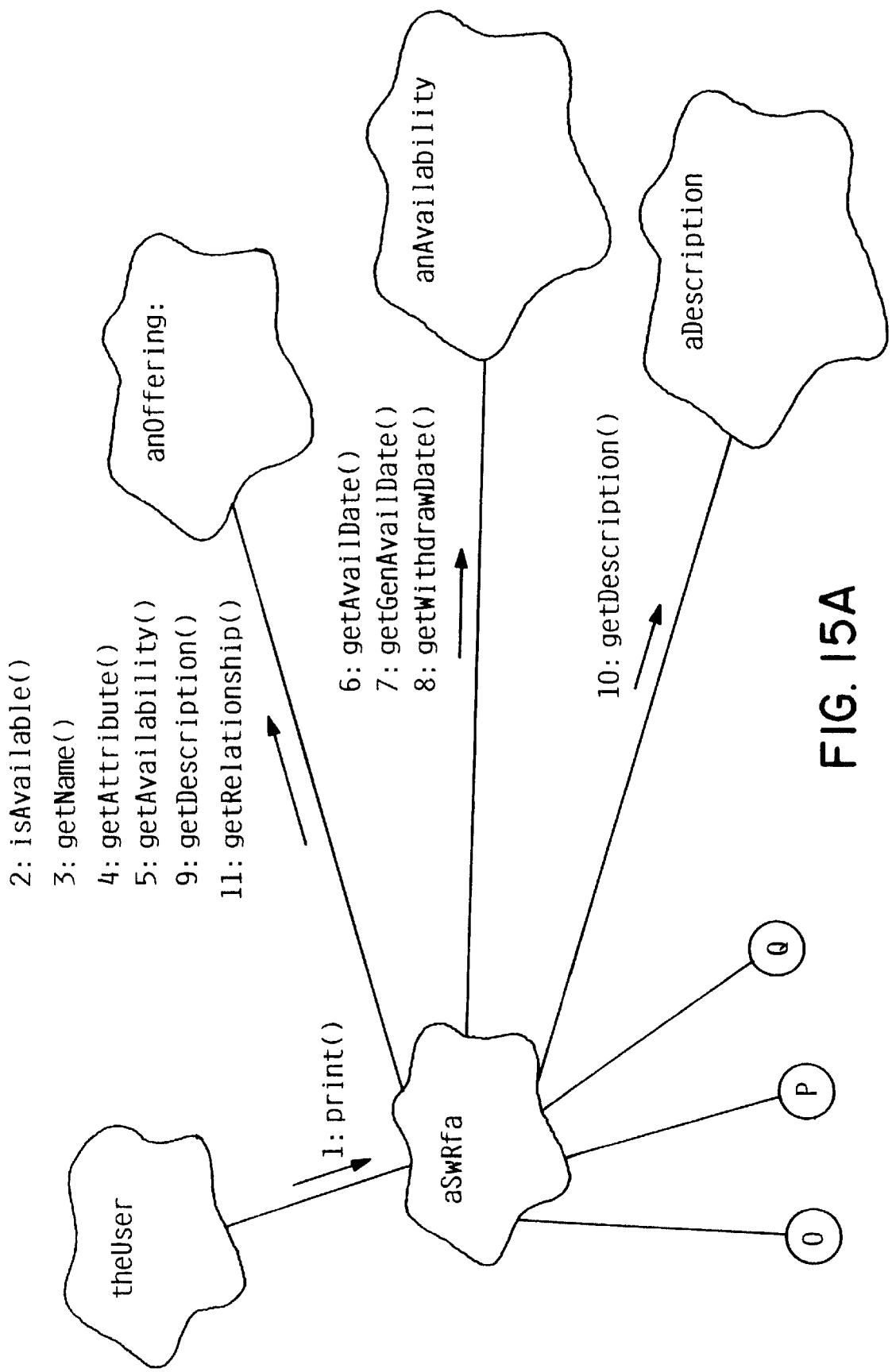
Figure 15B:
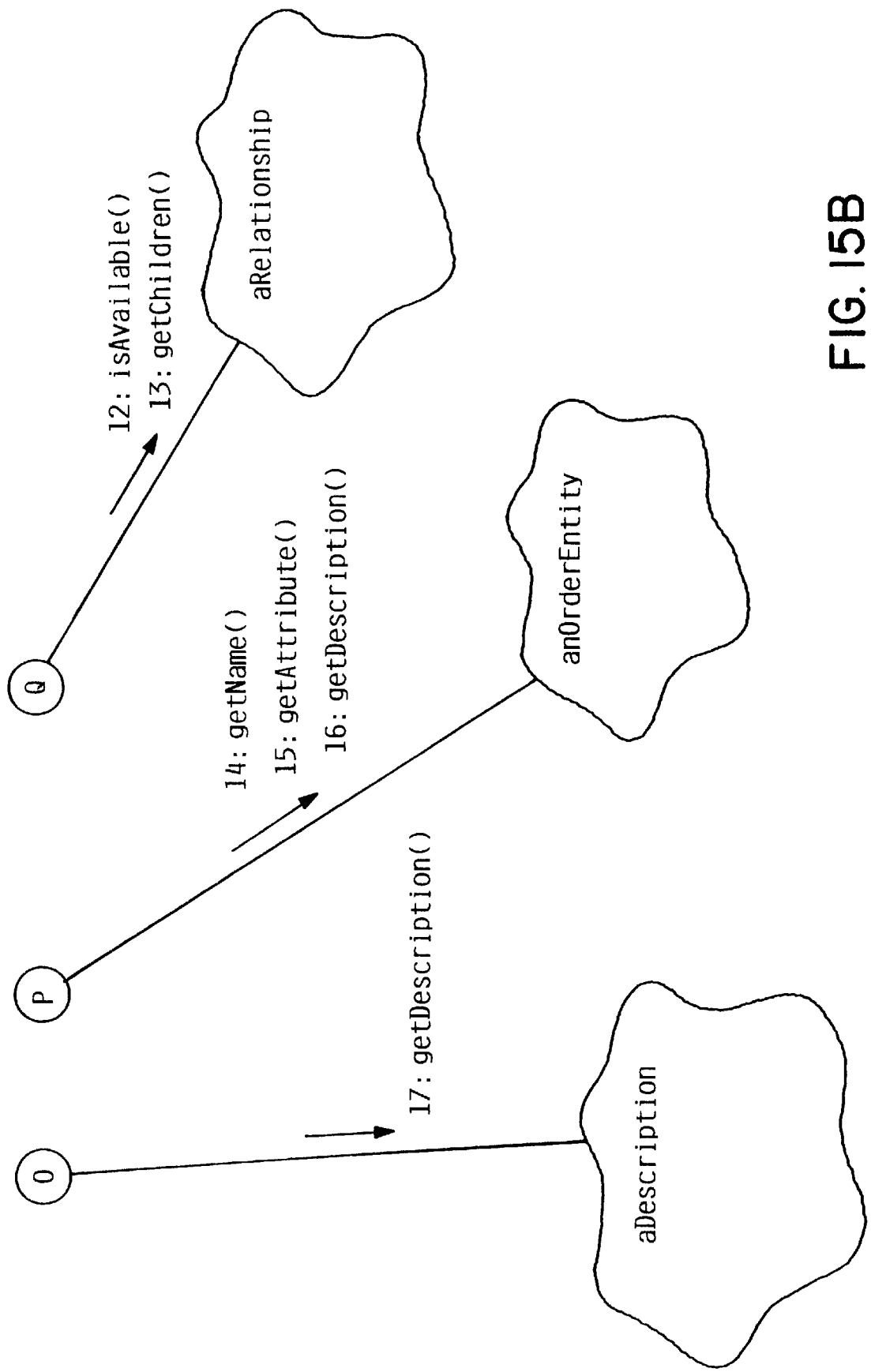

For the purpose of illustration, one specific offering entitled SWRFA is shown in FIG. 10 as a concrete subclass of the Offering class. A SWRFA is a software request for announcement, which is one way that IBM uses to communicate software product information to marketing. One specific order entity entitled SWPriceFile is also shown as a concrete subclass of OrderEntity. SWPriceFile represents a file with pricing information for a many different order entities. Each of these concrete subclasses contain their parents, making the data and methods of the parents available to these subclasses. The subclasses SWRFA and SWPriceFile are shown for the purpose of describing the object interaction for sample scenarios as shown in FIGS. 14 and 15, which is discussed in greater detail below. As shown by these two specific examples, the Offering, OrderEntity, and MfgEntity classes provide extensible interfaces that allow a consumer of the framework to take advantage of the flexibility and power of the framework by easily adapting the framework to new or different fulfillment requirements environments. The specific implementation shown in the figures for the classes are shown for the purpose of illustration, and a framework consumer may select alternative implementations by overriding extensible methods in the classes or by defining different or additional subclasses according to specific performance requirements.

The relationships between entities provide a real advantage when comparing software applications that use the framework with the disjoint prior art software applications that are used at the various stages of marketing, ordering, and manufacturing. By subclassing each item that needs to be separately tracked from a common Entity class, all of these items may access common data across the various different disciplines in the marketing, ordering, and manufacturing process. Note that the concrete subclasses of Offering, OrderEntity, and MfgEntity are shown herein by way of example of suitable subclasses of the Entity class. The number of disciplines represented and the granularity of these representations depends upon the specific process that needs to be modeled using the framework mechanism 870. For example, in the manufacturing of computers, various other entities may exist, including individual electronic components, circuit board assemblies, upgrade kits, software programs, etc. Parts procurement, incoming inspection of parts, and assembly could also be different entities. The power of framework mechanism 870 is that practically any process may be modeled by defining entities, relationships between entities, availability of entities, history of entities, and description of entities. By extending the framework, nearly any process may be represented, and the data that defines the process nay be shared by all entities that participate in the process.

Core Functions

FIG. 10 best distinguishes between core and extensible functions in the fulfillment requirements framework of the present invention. Specifically, as noted above, many of the classes in this framework are extensible classes. All class relationships shown in FIG. 10 are core relationships, aid may not be modified by the consumer of the framework. In fact, it is the fixed character of these relationships between classes that characterizes a framework and makes it useful and powerful. The core function of the fulfillment requirements framework is defined by the core classes, the core class relationships, and the functional requirements that cause the framework to behave in the desired manner. As described above with respect to FIG. 9, the overall core function of the fulfillment requirements framework includes the steps of method 900. Note, however, that not all of the steps of method 900 need be implemented in a particular fulfillment requirements environment. For example, printing may not be required in certain circumstances, so the printing step 930 could be omitted. The various functions of FIG. 9 are core functions not because they are always performed, but because the framework provides support for the implementation of each of these steps. The specific steps that make up any fulfillment requirements environment depend on how the consumer of the framework extends the classes and defines (or overrides) the appropriate methods.

Object Interaction

Figure 11A:
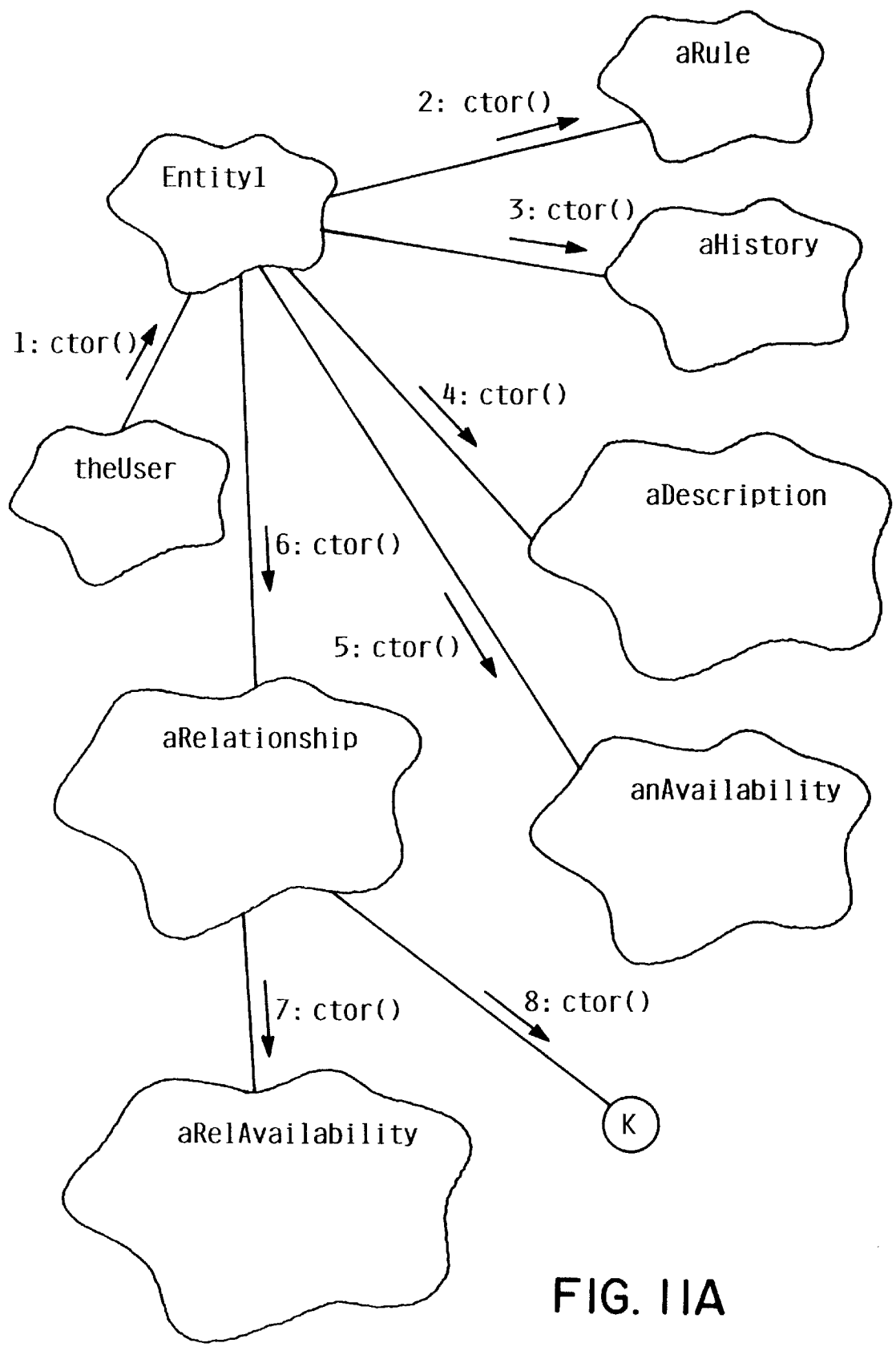
FIGS. 11–15 are object diagrams of sample fulfillment requirements configurations in accordance with the class diagram of FIG. 10.
Figure 11B:
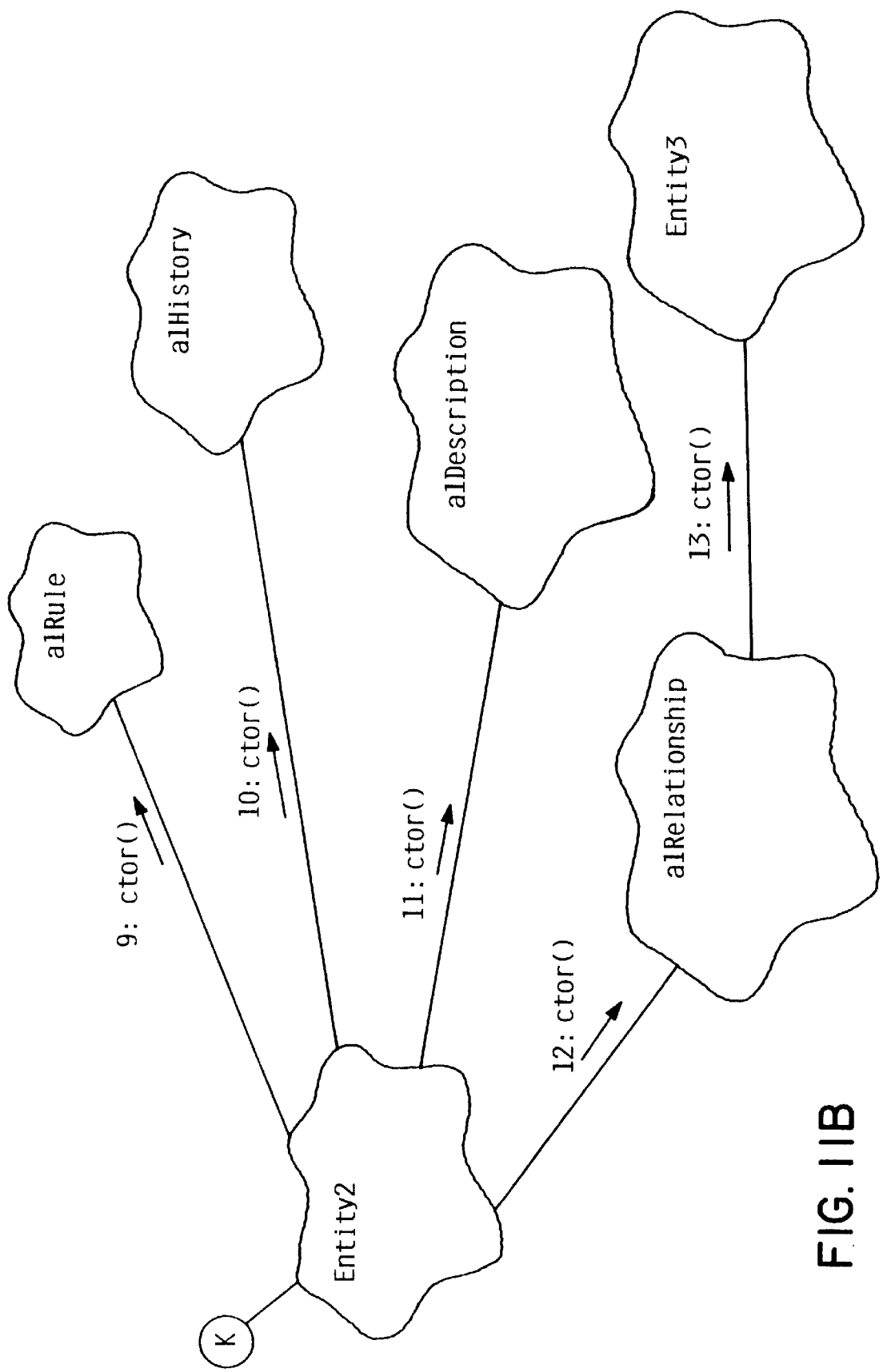
Figure 12A:
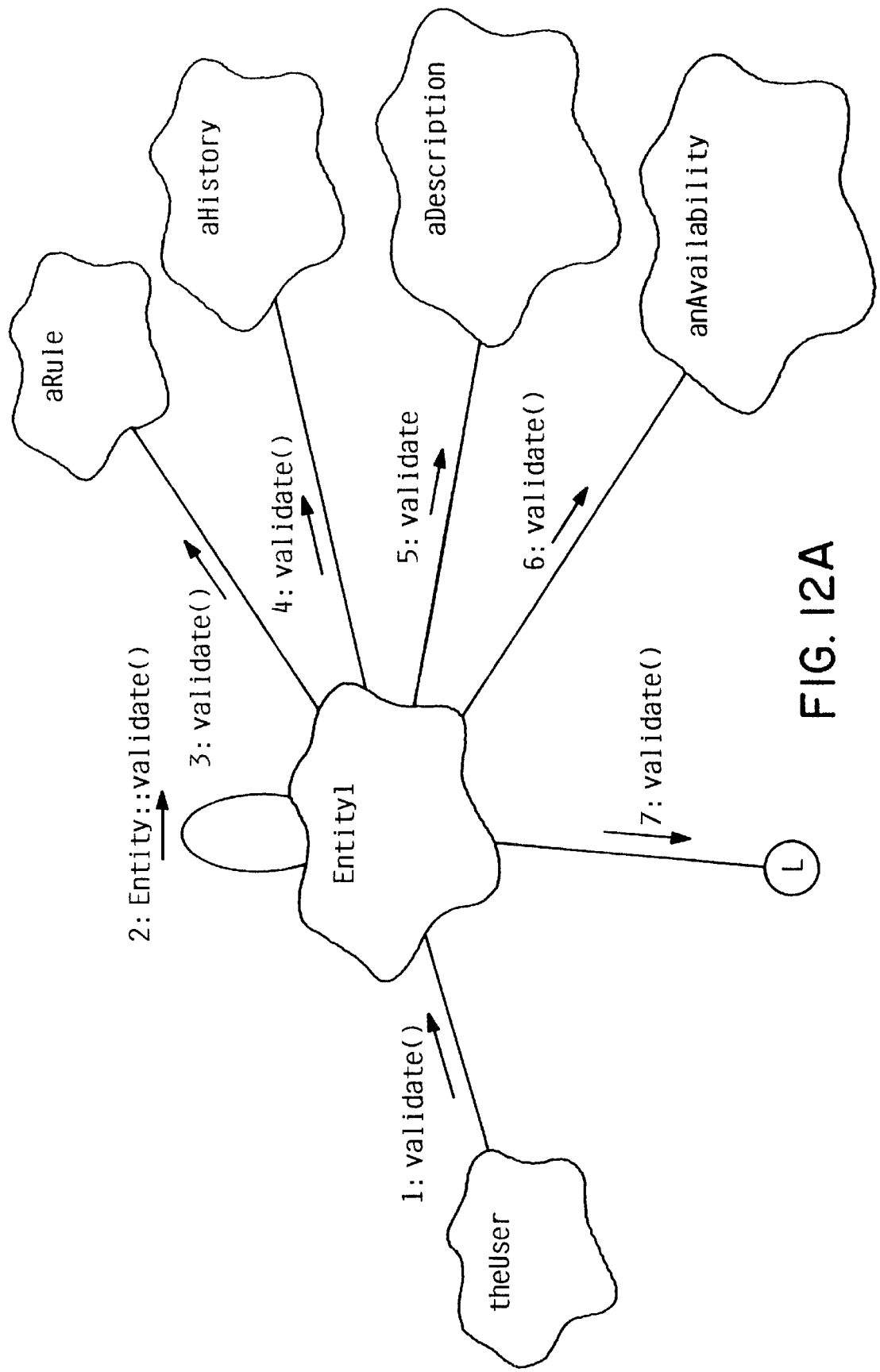
Figure 12B:
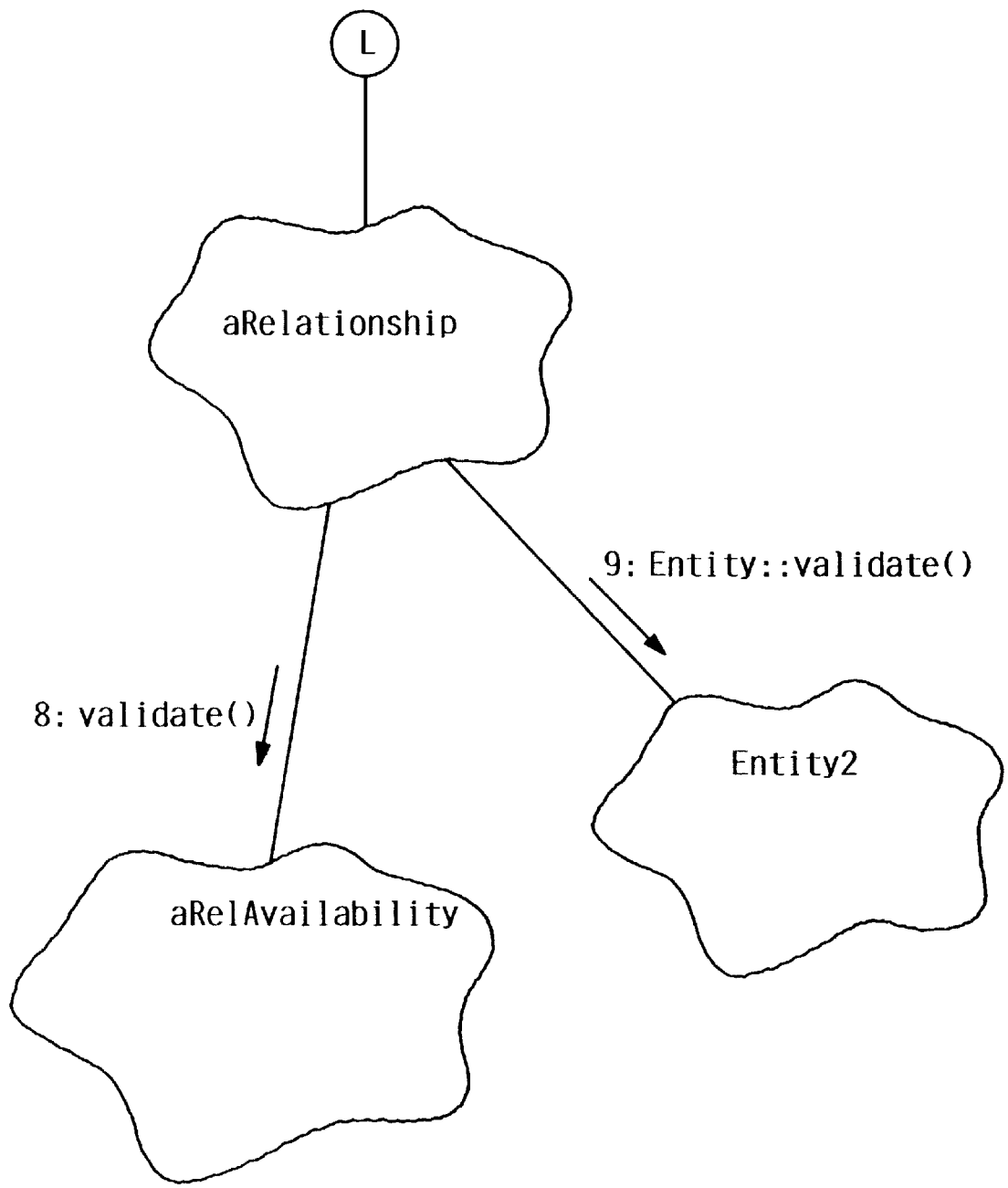
Figure 13A:
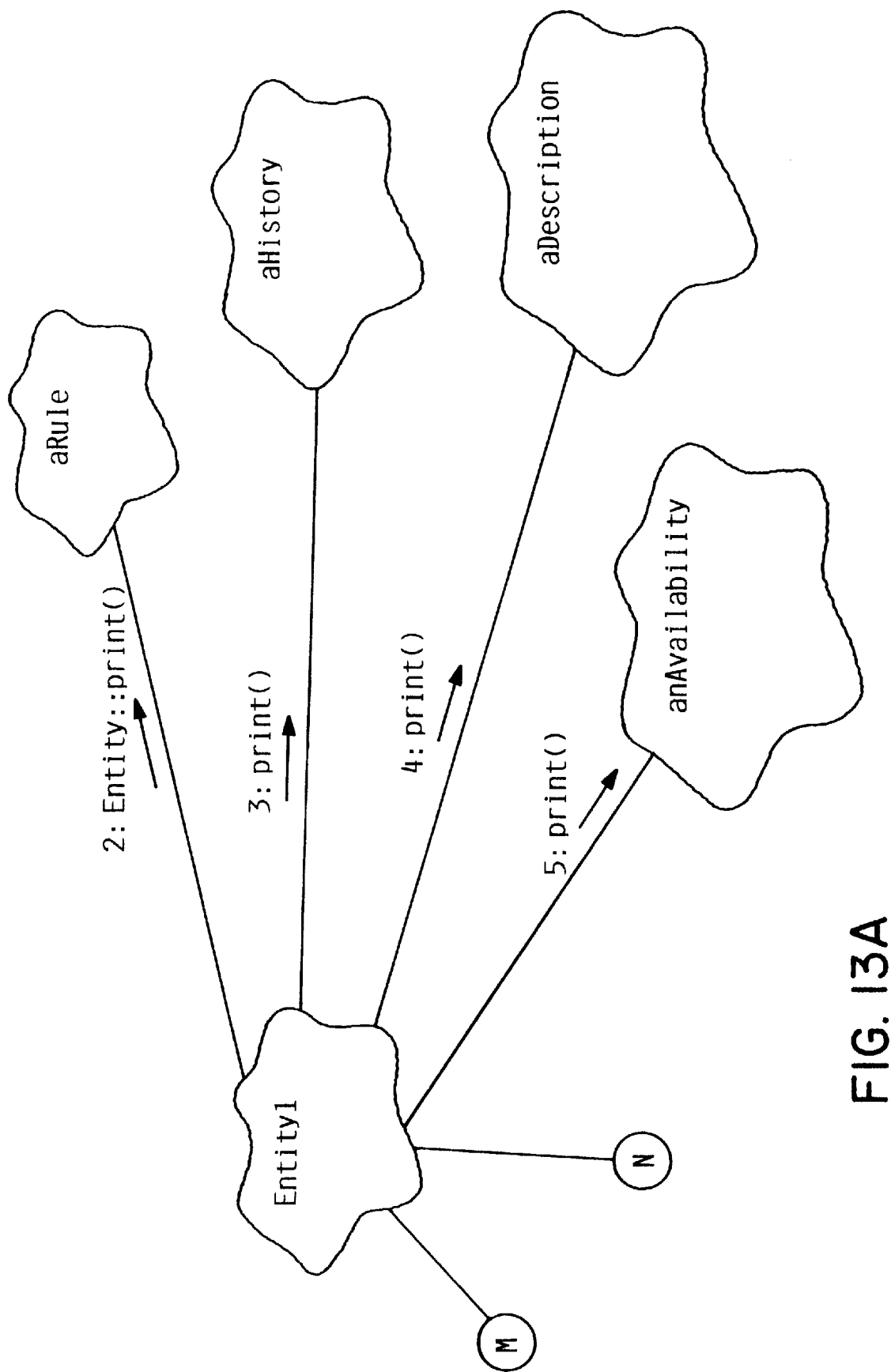
Figure 13B:
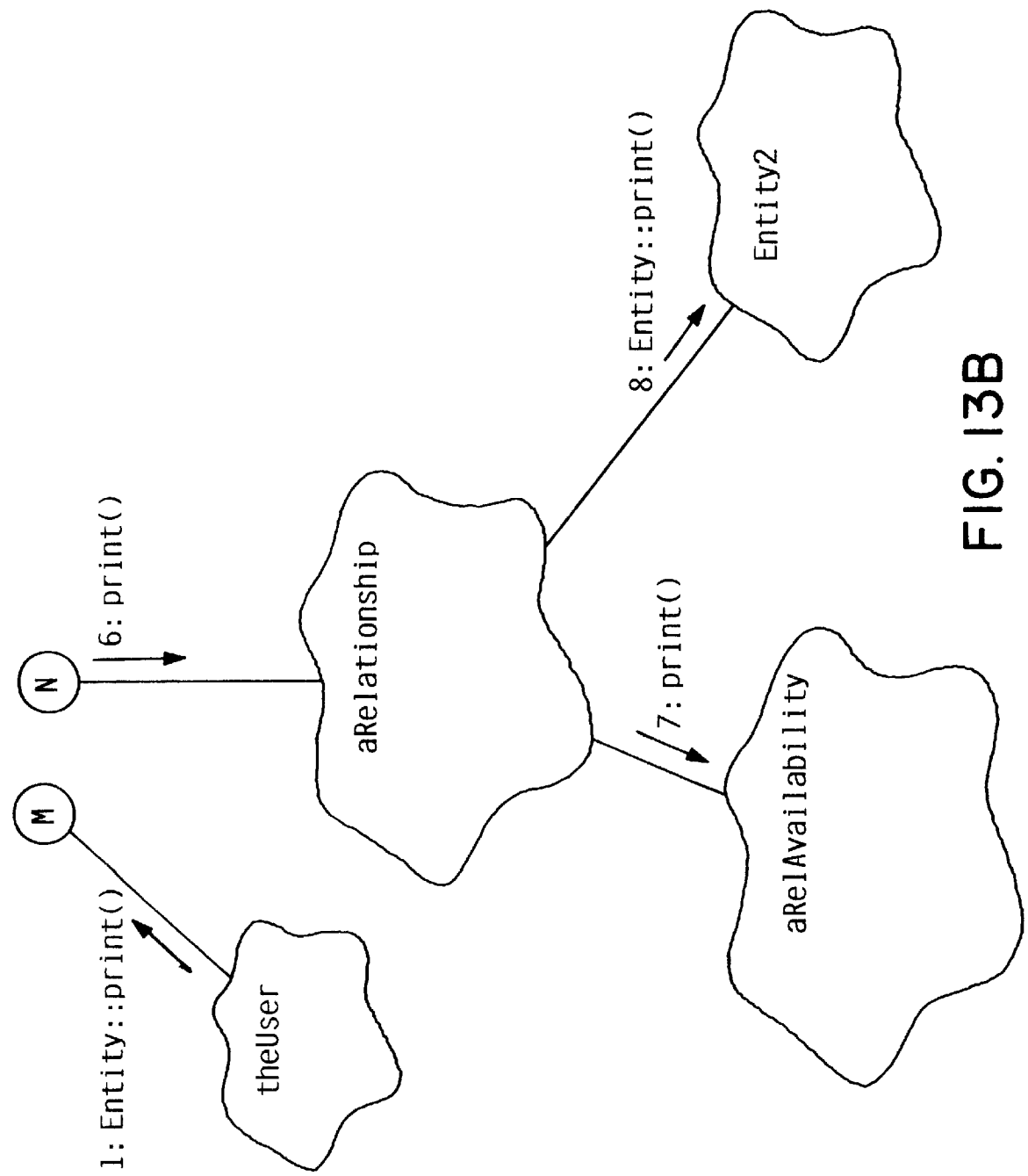

The detailed operation of framework 870 in accordance with the preferred embodiments will now be illustrated with reference to the object diagrams of FIGS. 11–15. FIGS. 11–13 represent the function of default methods on any entity created within the framework 870. FIGS. 14 and 15 represent one extremely simplified fulfillment requirements environment that results from implementing the SWRFA subclass of Offering and from implementing the SWPriceList subclass of OrderEntity, where Offering and OrderEntity are both subclasses of the Entity class, as shown in FIG. 10. Of course, many more fulfillment requirements, environments may be implemented with the framework. If a fulfillment requirements environment has the same common features with a different environment that is already implemented in the framework, the new environment may use the same subclass without halving to duplicate the effort to re-generate the code from scratch. For example, by providing the Offering, OrderEntity, and MfgEntity classes of FIG. 10 within the framework 870, a framework consumer may easily subclass from these predefined entities to implement a fulfillment requirements environment that suits their purpose. From this we see the power and flexibility of providing a framework for managing fulfillment requirements. In sum, the framework not only makes the programmer's job easier, but it also makes the code much more portable to other applications, and makes the code much easier to maintain.

Referring to FIG. 11, the objects for a desired fulfillment requirements environment are created by a client invoking the ctor( ) method on one of the concrete subclasses defined by the framework consumer. The client may be a human operator, a procedural program, or another object. The client is denoted in the object diagrams of FIGS. 11–15 as theUser object. Let's assume theUser invokes the ctor( ) method on the Entity class (step 1). This method creates the object Entity1, which invokes the ctor( ) methods on any classes that define objects that should be contained within Entity1. Assuming that Entity1 contains one object from each of the potential classes, the Entity1 object invokes the ctor( ) method on the Rule class to create the object aRule (step 2); on the History class to create the object aHistory (step 3); on the Description class to create the object aDescription (step 4); on the Availability class to define the object anAvailability (step 5); and on the Relationship class to define the object aRelationship (step 6). Creating the aRelationship object results in it invoking the ctor( ) methods on the Availability class to create the object aRelAvailability (step 7) and on the Entity class to create the object Entity2 (step 8). The creation of Entity2 causes it to invoke the ctor( ) methods on the classes it contains (steps 9–12). Finally, the alRelationship object invokes the constructor method ctor( ) on the Entity class to create the object Entity3. Needless to say, the size of an actual fulfillment requirements environment to solve a real-world problem will have hundreds or thousands of objects. The example of FIG. 11 is extremely simplified to illustrate some of the salient features of the fulfillment requirements framework mechanism in accordance with the present invention. In fact, the object diagram of FIG. 11 is further simplified in FIGS. 12 and 13 by not showing the contained objects of the Entity2 object or their contained objects for the sake of clarity.

Once the objects for the framework have been instantiated, various operations may be performed on these objects. One of these operations is to validate the data and the relationships between objects. This validation is performed by a client (represented by the object theUser) invoking the validate( ) method on one of the entities. Referring to FIG. 12, we assume that theUser invokes the validate( ) method on the Entity1 object (step 1), which in turn causes all the validate( ) methods on the contained objects to be invoked (steps 3–7). Invoking the validate( ) method on the aRelationship object (step 7) causes the aRelationship object to Validate all its contained objects by invoking each of their validates methods (steps 8 and 9). This process continues until all objects in the fulfillment requirements environment have been validated. Assuming that all objects in this fulfillment requirements environment have valid data and relationships, the validate( ) method on Entity1 (step 1) will finally return a result indicating that the environment has been validated.

Once the fulfillment requirements environment has been validated, printing the various entities, rules, histories, descriptions, availabilities, and relationships of the environment may be performed by a client invoking the print( ) method on any entity. Referring to FIG. 13, the object theUser invokes the print( ) method on the Entity1 object. Similar to the create( ) and validate( ) methods discussed above, invoking the print( ) method on an entity causes the entity to invoke the print( ) methods on all its contained objects (steps 2–6). In similar fashion, invoking print( ) on the aRelationship object causes it to invoke the print( ) methods on all its contained objects (steps 7 and 8). The object Entity1 collects the information printed from its contained objects, and prints this information in a format dictated by the internal implementation of Entity1. This printing, as explained above, could be to a printer, to a file, to a database, to a remote computer system over a network, or to any other item that needs data in a particular format.

The way that objects are created (FIG. 11), validated (FIG. 12), and printed (FIG. 13) illustrate the broad core functions performed by any application developed by extending fulfillment requirements framework 870, and correspond to the respective steps 910, 920, and 930 of FIG. 9. What is key about these core functions is that accessing an entity causes all of its contained objects to be accessed, which, in turn cause their contained objects to be accessed, and so on, until all the required objects have been accessed. In this manner, framework mechanism 870 encapsulates all knowledge of any specific interconnection or interrelation of objects into a very simple user interface. By accessing one entity, all relevant entities are in turn accessed without the user knowing or caring about the specific number, arrangement, or characteristics of the contained objects.

While FIGS. 11–13 described above depict the core functions of framework mechanism 870 (i.e., the functions any computer program that use framework mechanism 870 may perform), FIGS. 14 and 15 depict a more detailed implementation wherein a SWRFA class and SWPriceFile class are defined as subclasses of an Offering class and Order entity class, respectively, which are both subclasses of the Entity class. We assume for this specific example that the creation of the aSWPriceFile object defines a partial key that this particular object corresponds to. Going back to our example of a computer system marketing and manufacturing operation, we assume that the creation of aSWPriceFile defines a specific machine type and model that the software price file applies to. This machine type and model comprise a selection criteria for the create( ) and validate( ) methods (e.g., of FIGS. 12 and 13). This selection criteria dictates what objects are created and validated. For example, when the ctor( ) method on the SWPriceFile class is invoked, it is passed a machine type and model number as selection criteria. When aSWPriceFile creates the objects it contains, it creates only those that match the selection criteria. We assume for our example that there are feature codes that define features of a computer system, so the aSWPriceFile object creates the feature codes that correspond to the specified machine type and model number.

For the detailed discussion of the print( ) method of FIG. 14, we assume that the relevant selection criteria is passed in the print command (step 1), along with the name of the output file and an error log. The aSWPriceFile object selects one of its contained order entities anOrderEntity that corresponds to one of the feature codes that matches the selection criteria, and invokes the whereUsed( ) method to determine all the relationships that the anOrderEntity object has (step 2). Next, the getAvailability( ) method on the aRelationship object is called (step 3) to determine if the order entity (i.e., feature code) is available based on the parameters passed. For example, the availability of a software program entity may depend on the date range(s), the country or countries, the language(s) for the software, and the release(s) specified in the selection criteria. If the getAvailability( ) method is invoked, for example, with selection criteria that specifies the availability of the software program OS/400 release 2.0 or higher in the English language in the United Kingdom after Jun. 1, 1997, the getAvailability( ) method will return the availabilities that apply. Note that the selection criteria suitably includes multiple parameters so that a set of availabilities that match the selection criteria may be returned.

Next, the getWithdrawDate( ) method is called on the anAvailability object (step 4) to provide documentation regarding when the feature codes that match the selection criteria became unavailable. If the feature code is available, the getWithdrawDate( ) method returns a null parameter. If, however, the feature code has no availabilities that match the selection criteria, the latest withdraw date of all the potential availabilities is returned to document when the feature code became unavailable.

The name of the feature code is retrieved by invoking the getName( ) method on the anOrderEntity object (corresponding to the feature code) (step 5). Next, the description of the feature code is retrieved using the getDescription( ) method on anOrderEntity (step 6). The aSWPriceFile then prints the needed information into an appropriate format into the output file name specified in the parameters passed in the print method in step 1.

The object diagram of FIG. 14 illustrates one possible implementation of a print( ) method for a single feature code, but this implementation can be easily extended to multiple feature codes. For example, if multiple feature codes are present that meet the selection criteria, steps 2–6 will be repeated for each feature code (i.e., order entity object) until all relevant feature codes have been considered for printing.

To illustrate the operation of the print( ) method of FIG. 14, let's assume we have specified a machine type of mini-computer and a model number of AS/400, which define a corresponding object aSWPriceFile. We determine that we want a price list for next month in Germany for the English language version of the OS/400 release 2.0 software for the AS/400 computer. So when invoking the print( ) method, we pass the selection criteria, which includes the date, country, language, and release for the entity desired. We select a first feature code that corresponds to OS/400, and invoke the whereUsed( ) method (step 2) to determine every relationship that specifies the first feature code. Next, the getAvailability( ) method is invoked (step 3), passing the selection criteria, to determine if the first feature code is available as specified. Next, the getWithdrawDate( ) method on the anAvailability( ) object is invoked (step 4) to determine the withdrawal date if the first feature code is no longer available. Assuming that the feature code has at least one availability, the name and description of the feature code are printed (steps 5 and 6). If not, they are not printed. The aSWPriceFile object then proceeds to execute steps 2–6 for each feature code (i.e., order entity) that corresponds to the OS/400 operating system for the AS/400 mini-computer.

The specific implementation of FIG. 14 is shown to explain how framework mechanism 870 may be extended to provide a fulfillment requirements manager that has specific requirements. By analogy, one skilled in the OO art will recognize that the number of variations possible with framework mechanism 870 is without limit, and that any appropriate extension of the framework mechanism 870 to accomplish the detailed functions of a particular fulfillment requirements manager is within the scope of the present invention.

Another specific example of object interaction for the fulfillment requirements environment that includes the SWRFA class and the SWPriceFile class (FIG. 10) is shown in FIG. 15. We assume again that the creation of the aSWRFA object caused it to create all the offerings that correspond to the particular machine type and model, for example a mini-computer that is an AS/400 (as above). When the print( ) method on the aSWRFA object is invoked (step 1), it selects a first entity (an offering in this particular example) and calls the isAvailable( ), getName( ), getAttribute( ) and getAvailability( ) methods on that entity (steps 2–5). Invoking getAvailability( ) causes the methods getAvailDate( ), getGenAvailDate( ), and getWithdrawDate( ) to be invoked on each availability object that corresponds to the offering steps 6–8). Next, the getDescription( ) method on the anOffering object is invoked (step 9), which causes the getDescription( ) method on all contained description objects to be invoked (step 10). Next, the getRelationship( ) method on the anOffering object is invoked (step 11), which causes the isAvailable( ) and the getChildren( ) methods to be invoked on each relationship (steps 12 and 11). The getChildren( ) method returns the other entity that the first entity (i.e., offering) is related to, which we assume for this example is the anOrderEntity object. The getName( ), getAttribute( ) and getDescription( ) methods are all called on the related entity (steps 14–16). The getDescription( ) method in step 16 returns the description object anOEDescription, and its getDescription( ) method is called. This procedure continues until all entities that match the selection criteria have been printed.

As the examples above illustrate, the framework provides an extremely flexible and powerful tool for implementing any number of fulfillment requirements environments by simply defining objects that implement the features specific to a particular fulfillment requirements environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. Note that the term "user" as used in the claims denotes any human programmer (such as a framework consumer) or any software program that is capable of extending the framework mechanism to define a particular fulfillment requirements environment.

We claim:

1. An apparatus, the apparatus managing fulfillment requirements for at least one item, the apparatus comprising:
   a processor; and
   a memory coupled to the processor; and
   an object-oriented framework mechanism residing in the memory and executed by the processor, the framework mechanism providing at least one fulfillment requirements environment.

2. The apparatus of claim 1 wherein the framework mechanism comprises an entity class, the entity class defining:
   at least one entity object corresponding to the at least one fulfillment requirements environment; and
   a first set of object methods to perform a plurality of predetermined functions to implement the fulfillment requirements environment.

3. The apparatus of claim 2 wherein the entity class is an extensible class of the framework mechanism, the implementation of which by a user defines the at least one fulfillment requirements environment.

4. The apparatus of claim 2 wherein the first set of object methods includes:
   at least one object method that creates the at least one entity object;
   at least one object method that validates the at least one entity object;
   at least one object method that prints the at least one entity object;
   at least one object method that determines if the at least one entity object is available;
   at least one object method that retrieves attributes of the at least one entity object;
   at least one object method that retrieves availability of the at least one entity object;
   at least one object method that retrieves a description for the at least one entity object;
   at least one object method that retrieves a name for the at least one entity object;
   at least one object method that retrieves at least one relationship for the at least one entity object; and
   at least one object method that determines in which of the at least one relationship the at least one entity is used.

5. The apparatus of claim 2 wherein the framework mechanism further comprises:
   a class derived from the entity class that defines an entity offered to a customer;
   a class derived from the entity class that defines an entity that is ordered that corresponds to the entity offered to the customer; and
   a class derived from the entity class that defines an entity that is delivered to the customer that corresponds to the entity offered to the customer and to the entity that is ordered.

6. The apparatus of claim 1 wherein the framework mechanism comprises an availability class, the availability class defining:
   at least one availability object corresponding to at least one entity object that is part of the fulfillment requirements environment; and
   a second set of object methods to determine the availability of the at least one entity object.

7. The apparatus of claim 1 wherein the framework mechanism comprises a relationship class, the relationship class defining:
   at least one relationship object corresponding to a plurality of entity objects; and
   a third set of object methods to determine at least one relationship between the plurality of entity objects.

8. The apparatus of claim 1 wherein the framework mechanism comprises a history class, the history class defining:
   at least one history object corresponding to at least one entity object that is part of the fulfillment requirements environment; and
   a fourth set of object methods for determining the history of changes made to the at least one entity object.

9. The apparatus of claim 1 wherein the framework mechanism comprises a description class, the description class defining:
   at least one description object corresponding to at least one entity object that is part of the fulfillment requirements environment; and
   a fifth set of object methods for retrieving a description for the at least one entity object.

10. The apparatus of claim 1 wherein the framework mechanism comprises a rule class, the rule class defining:
    at least one rule object corresponding to at least one entity object that is part of the fulfillment requirements environment; and
    a sixth set of object methods for retrieving at least one rule for the at least one entity object.

11. The apparatus of claim 2 wherein the framework mechanism further comprises an availability class, the availability class defining:
    at least one availability object corresponding to the at least one entity object; and
    a second set of object methods to determine the availability of the at least one entity object.

12. The apparatus of claim 11 wherein the second set of object methods includes:
    at least one object method that determines the availability date for the at least one entity object;

at least one object method that determines the general availability date for the at least one entity object; and at least one object method that determines the withdraw date for the at least one entity object.

13. The apparatus of claim 11 wherein the availability class is a core class of the framework mechanism, the implementation of which cannot be changed by a user.

14. The apparatus of claim 11 wherein the framework mechanism further comprises a relationship class, the relationship class defining:

at least one relationship object corresponding to a plurality of entity objects; and a third set of object methods to determine at least one relationship between the plurality of entity objects.

15. The apparatus of claim 14 wherein the third set of object methods includes:

at least one object method that determines the availability for the at least one entity object;

at least one object method that retrieves the attributes for the at least one entity object; and at least one object method that retrieves at least one children object, if any exist, for the at least one entity object.

16. The apparatus of claim 14 wherein the relationship class is a core class of the framework mechanism, the implementation of which cannot be changed by a user.

17. The apparatus of claim 14 wherein the framework mechanism further comprises a history class, the history class defining:

at least one history object corresponding to the at least one entity object; and a fourth set of object methods for determining the history of changes made to the at least one entity object.

18. The apparatus of claim 17 wherein the history class is a core class of the framework mechanism, the implementation of which cannot be changed by a user.

19. The apparatus of claim 17 wherein the framework mechanism further comprises a description class, the description class defining:

at least one description object corresponding to at least one entity object; and a fifth set of object methods for retrieving a description for the at least one entity object.

20. The apparatus of claim 19 wherein the description class is a core class of the framework mechanism, the implementation of which cannot be changed by a user.

21. The apparatus of claim 19 wherein the framework mechanism further comprises a rule class, the rule class defining:

at least one rule object corresponding to the at least one entity object; and a sixth set of object methods for retrieving at least one rule corresponding to the at least one entity object.

22. The apparatus of claim 21 wherein the rule class is an extensible class of the framework mechanism, the implementation of which by a user defines the at least one fulfillment requirements environment.

23. The apparatus of claim 21 wherein the entity class and the rule class are extensible classes of the framework mechanism, the implementation of which by a user defines the at least one fulfillment requirements environment, and wherein the availability class, the relationship class, the history class, and the description class are all core classes of the framework mechanism, the implementation of which cannot be changed by a user.

24. The apparatus of clam 21 wherein the entity class has a "contains by value" relationship with the availability class, the relationship class, the history class, the description class, and the rule class.

25. The apparatus of claim 1 wherein the memory contains an application program that supports an object oriented programming environment containing the framework mechanism, and wherein the framework mechanism is extended by providing information that implements the at least one fulfillment requirements environment.

26. The apparatus of claim 1 wherein the framework mechanism comprises:

at least one core function defined by at least one core class and by the relationships between a plurality of classes within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

27. A method for managing fulfillment requirements, the method comprising the steps of:

providing an extensible object oriented framework mechanism that performs the managing of the fulfillment requirements according to extended portions of the framework mechanism that are customized to provide a desired fulfillment requirements environment; and executing the object oriented framework mechanism on an apparatus.

28. The method of claim 27 further including the step of:

extending the framework mechanism to define the desired fulfillment requirements environment.

29. The method of claim 27 further including the steps of:

(a) creating a plurality of entity objects;

(b) validating the plurality of entity objects; and (c) printing the plurality of entity objects.

30. The method of claim 29 further including the steps of:

(d) determining a plurality of relationships between at least two of the plurality of entity objects;

(e) determining availability for at least one of the plurality of entity objects;

(f) determining a name for at least one of the plurality of entity objects;

(g) retrieving attributes for at least one of the plurality of entity objects; and (h) determining a description for at least one of the plurality of entity objects.

31. The method of claim 29 wherein the step of creating a plurality of entity objects includes the steps of:

(1) creating a first entity object;

(2) the creation of the first entity object causing the creation of a plurality of objects that are contained within the first entity object; and (3) the creation of a selected one of the plurality of objects causing the creation of any objects contained within the selected object until all of the plurality of entity objects and any objects associated with the plurality of entity objects are created.

32. The method of claim 30 wherein the step of validating the plurality of entity objects includes the steps of:

(1) validating a first entity object;

(2) the validation of the first entity object causing the validation of a plurality of objects that are contained within the first entity object; and (3) the validation of a selected one of the plurality of objects causing the validation of any objects contained within the selected object until all of the plurality of entity objects and any objects associated with the plurality of entity objects are validated.

33. The method of claim 30 wherein the step of printing the plurality of entity objects includes the steps of:

(1) printing a first entity object;

(2) the printing of the first entity object causing the printing of a plurality of objects that are contained within the first entity object; and (3) the printing of a selected one of the plurality of objects causing the printing of any objects contained within the selected object until all of the plurality of entity objects and any objects associated with the plurality of entity objects are printed.

34. A program product comprising:

an object-oriented framework mechanism for managing fulfillment requirements, the framework mechanism including an extensible fulfillment requirements mechanism that processes a plurality of orders according to extended portions of the framework mechanism; and signal bearing media bearing the framework mechanism.

35. The program product of claim 34 wherein the signal bearing media comprises recordable media.

36. The program product of claim 34 wherein the signal bearing media comprises transmission media.

37. The program product of claim 34 wherein the framework mechanism comprises:

at least one entity object that is part of the at least one fulfillment requirements environment; and a first set of object methods to perform a plurality of predetermined functions to implement the fulfillment requirements environment.

38. The apparatus of claim 37 wherein the entity class is an extensible class of the framework mechanism, the implementation of which by a user defines the at least one fulfillment requirements environment.

39. The program product of claim 37 wherein the first set of object methods includes:

at least one object method that creates the at least one entity object;

at least one object method that validates the at least one entity object;

at least one object method that prints the at least one entity object;

at least one object method that determines if the at least one entity object is available;

at least one object method that retrieves attributes of the at least one entity object;

at least one object method that retrieves availability of the at least one entity object;

at least one object method that retrieves a description for the at least one entity object;

at least one object method that retrieves a name for the at least one entity object;

at least one object method that retrieves at least one relationship for the at least one entity object; and at least one object method that determines in which of the at least one relationship the at least one entity is used.

40. The program product of claim 37 wherein the framework mechanism comprises:

at least one availability object corresponding to the at least one entity object; and a second set of object methods to determine the availability of the at least one entity object.

41. The program product of claim 37 wherein the framework mechanism comprises:

at least one relationship object corresponding to a plurality of entity objects; and a third set of object methods to determine at least one relationship between the plurality of entity objects.

42. The program product of claim 37 wherein the framework mechanism comprises:

at least one history object corresponding to the at least one entity object; and a fourth set of object methods for determining the history of changes made to the at least one entity object.

43. The program product of claim 37 wherein the framework mechanism comprises:

at least one description object corresponding to the at least one entity object; and a fifth set of object methods for retrieving a description for the at least one entity object.

44. The program product of claim 37 wherein the framework mechanism comprises:

at least one rule object corresponding to the at least one entity object; and a sixth set of object methods for retrieving at least one rule for the at least one entity object.

45. The program product of claim 37 wherein the framework mechanism further comprises:

at least one object that corresponds to an entity offered to a customer;

at least one object that corresponds to an entity that is ordered that corresponds to the entity offered to the customer; and at least one object that corresponds to an entity that is delivered to the customer that corresponds to the entity offered to the customer and to the entity that is ordered.

46. An object oriented framework mechanism for use in an apparatus that supports an object oriented programming environment, the framework mechanism comprising:

at least one entity object that is part of the at least one fulfillment requirements environment and a first set of object methods to perform a plurality of predetermined functions to implement the fulfillment requirements environment;

at least one availability object corresponding to the at least one entity object and a second set of object methods to determine the availability of the at least one entity object;

at least one relationship object corresponding to a plurality of entity objects and a third set of object methods to determine at least one relationship between the plurality of entity objects;

at least one history object corresponding to the at least one entity object and a fourth set of object methods for determining the history of changes made to the at least one entity object;

at least one description object corresponding to the at least one entity object and a fifth set of object methods for retrieving a description for the at least one entity object; and at least one rule object corresponding to the at least one entity object and a sixth set of object methods for retrieving at least one rule for the at least one entity object.

47. The object oriented framework mechanism of claim 46 further comprising:
   at least one object that corresponds to an entity offered to a customer;
   at least one object that corresponds to an entity that is ordered that corresponds to the entity offered to the customer; and
   at least one object that corresponds to an entity that is delivered to the customer that corresponds to the entity offered to the customer and to the entity that is ordered.

48. The object oriented framework mechanism of claim 46 wherein the first set of object methods includes:
   at least one object method that creates the at least one entity object;
   at least one object method that validates the at least one entity object;
   at least one object method that prints the at least one entity object;
   at least one object method that determines if the at least one entity object is available;
   at least one object method that retrieves attributes of the at least one entity object;
   at least one object method that retrieves availability of the at least one entity object;
   at least one object method that retrieves a description for the at least one entity object;
   at least one object method that retrieves a name for the at least one entity object;
   at least one object method that retrieves at least one relationship for the at least one entity object; and
   at least one object method that determines in which of the at least one relationship the at least one entity is used.

49. The object oriented framework mechanism of claim 46 wherein the framework mechanism comprises:
   at least one core function defined by relationships between a plurality of classes within the framework mechanism, wherein the implementation of the at least one core function is defined by the framework mechanism and cannot be modified by a user of the framework mechanism; and
   at least one extensible function defined by at least one extensible class, wherein the implementation of the at least one extensible function is defined by the user of the framework mechanism by extending the at least one extensible class.

50. A method for managing fulfillment requirements, the method comprising the steps of:
   (A) providing at least one entity object that is part of an object-oriented framework mechanism that provides at least one fulfillment requirements environment and a first set of object methods to perform a plurality of predetermined functions to implement the fulfillment requirements environment;
   (B) providing at least one availability object corresponding to the at least one entity object and a second set of object methods to determine the availability of the at least one entity object;
   (C) providing at least one relationship object corresponding to a plurality of entity objects and a third set of object methods to determine at least one relationship between the plurality of entity objects;
   (D) providing at least one history object corresponding to the at least one entity object and a fourth set of object methods for determining the history of changes made to the at least one entity object;
   (E) providing at least one description object corresponding to the at least one entity object and a fifth set of object methods for retrieving a description for the at least one entity object;
   (F) providing at least one rule object corresponding to the at least one entity object and a sixth set of object methods for retrieving at least one rule for the at least one entity object; and
   (G) executing the object oriented framework mechanism on an apparatus to process at least one order.

51. The method of claim 50 further including the step of:
   extending the framework mechanism to define the desired fulfillment requirements environment.

52. The method of claim 51 further including the steps of:
   selecting functions required by the desired fulfillment requirements environment; and
   extending the framework mechanism to implement an object method within the first set of object methods that performs all the selected functions.

53. The method of claim 52 further including the steps of:
   selecting at least one creation criterion for determining whether a selected object should be created within the fulfillment requirements environment;
   implementing the desired fulfillment requirements environment by defining the extended portions in accordance with the at least one creation criterion.

54. The method of claim 53 further including the steps of:
   selecting at least one validation criterion for determining whether a selected object within the fulfillment requirements environment is valid;
   the step of implementing the desired fulfillment requirements environment further including the step of defining the extended portions in accordance with the selected at least one validation criterion.

55. The method of claim 53 further including the steps of:
   selecting at least one printing criterion for printing information pertaining to at least one object within the fulfillment requirements environment;
   the step of implementing the desired fulfillment requirements environment further including the step of defining the extended portions in accordance with the selected at least one printing criterion.

56. A program product comprising:
   (A) an object oriented framework mechanism for managing fulfillment requirements including at least one entity object that is part of the at least one fulfillment requirements environment and a first set of object methods to perform a plurality of predetermined functions to implement the fulfillment requirements environment, at least one availability object corresponding to the at least one entity object and a second set of object methods to determine the availability of the at least one entity object, at least one relationship object corresponding to a plurality of entity objects and a third set of object methods to determine at least one relationship between the plurality of entity objects, at least one history object corresponding to the at least one entity object and a fourth set of object methods for determining the history of changes made to the at least one entity object, at least one description object corresponding to the at least one entity object and a fifth set of object methods for retrieving a description for the at least one entity object, and at least one rule object corresponding to the at least one entity object and a sixth set of object methods for retrieving at least one rule for the at least one entity object, wherein the object oriented framework mechanism manages fulfillment requirements according to extended portions of the framework mechanism that are customized to provide the desired fulfillment requirements environment; and (B) signal bearing media bearing the object oriented framework mechanism.

57. The program product of claim 56 wherein the signal bearing media comprises recordable media.

58. The program product of claim 56 wherein the signal bearing media comprises transmission media.

59. The program product of claim 56 wherein the object oriented framework mechanism further comprises:

at least one object that corresponds to an entity offered to a customer;

at least one object that corresponds to an entity that is ordered that corresponds to the entity offered to the customer; and at least one object that corresponds to an entity that is delivered to the customer that corresponds to the entity offered to the customer and to the entity that is ordered.

60. The program product of claim 56 wherein the at least one entity object and the at least one rule object are defined by extensible classes of the framework mechanism, the implementation of which by a user defines the at least one fulfillment requirements environment.

61. The program product of claim 60 wherein the at least one availability object, the at least one relationship object, the at least one history object, and the at least one description object are defined by core classes of the framework mechanism, the implementation of which cannot be changed by a user.

62. An object oriented framework mechanism that manages fulfillment requirements, the framework mechanism comprising:

at least one core function defined by relationships between a plurality of classes within the framework mechanism, wherein the implementation of the at least one core function is defined by the framework mechanism and cannot be modified by a user of the framework mechanism; and at least one extensible class wherein the implementation of the at least one extensible class is defined by the user of the framework mechanism, by extending the at least one extensible class, thereby defining at least one fulfillment requirements environment.

63. The object oriented framework mechanism of claim 62 further comprising:

at least one entity object that is part of the at least one fulfillment requirements environment and a first set of object methods to perform a plurality of predetermined functions to implement the fulfillment requirements environment;

at least one availability object corresponding to the at least one entity object and a second set of object methods to determine the availability of the at least one entity object;

at least one relationship object corresponding to a plurality of entity objects and a third set of object methods to determine at least one relationship between the plurality of entity objects;

at least one history object corresponding to the at least one entity object and a fourth set of object methods for determining the history of changes made to the at least one entity object;

at least one description object corresponding to the at least one entity object and a fifth set of object methods for retrieving a description for the at least one entity object; and at least one rule object corresponding to the at least one entity object and a sixth set of object methods for retrieving at least one rule for the at least one entity object.

64. The object oriented framework mechanism of claim 63 further comprising:

at least one object that corresponds to an entity offered to a customer;

at least one object that corresponds to an entity that is ordered that corresponds to the entity offered to the customer; and at least one object that corresponds to an entity that is delivered to the customer that corresponds to the entity offered to the customer and to the entity that is ordered.

65. The object oriented framework mechanism of claim 63 wherein the framework mechanism comprises an entity class, an availability class, a relationship class, a history class, a description class, and a rule class, and wherein the entity class has a "contains by value" relationship with each of the availability class, the relationship class, the history class, the description class, and the rule class.

66. A method for managing fulfillment requirements using an apparatus having a processor and a memory, the memory having an application program that provides an object oriented programming environment, the method comprising the steps of:

(A) providing in the program an object oriented framework mechanism that performs the fulfillment requirements according to extended portions of the framework mechanism that are customized to provide a desired fulfillment requirements environment, the framework mechanism including:

a set of core functions wherein the implementation of the core functions is defined by the framework mechanism and cannot be modified by a user of the framework mechanism; and a set of extensible functions wherein the implementation of the extensible functions is defined by the user of the framework mechanism;

(B) extending the extensible functions in the framework mechanism to define particular classes having predetermined protocols and defining particular object methods that perform the fulfillment requirements, the extensible functions defining the desired fulfillment requirements environment;

(C) generating an executable fulfillment requirements system by integrating together the extensible functions and the core functions; and (D) executing the executable fulfillment requirements system on the apparatus.

67. The method of claim 66 further including the steps of:

(a) creating a plurality of entity objects;

(b) validating the plurality of entity objects; and (c) printing the plurality of entity objects.

68. The method of claim 67 further including the steps of:

(d) determining a plurality of relationships between at least two of the plurality of entity objects;

(e) determining availability for at least one of the plurality of entity objects;

(f) determining a name for at least one of the plurality of entity objects;

(g) retrieving attributes for at least one of the plurality of entity objects; and (h) determining a description for at least one of the plurality of entity objects.

69. The method of claim 67 wherein the step of creating a plurality of entity objects includes the steps of:

(1) creating a first entity object;

(2) the creation of the first entity object causing the creation of a plurality of objects that are contained within the first entity object; and (3) the creation of a selected one of the plurality of objects causing the creation of any objects contained within the selected object until all of the plurality of entity objects and any objects associated with the plurality of entity objects are created.

70. The method of claim 67 wherein the step of validating the plurality of entity objects includes the steps of:

(1) validating a first entity object;

(2) the validation of the first entity object causing the validation of a plurality of objects that are contained within the first entity object; and (3) the validation of a selected one of the plurality of objects causing the validation of any objects contained within the selected object until all of the plurality of entity objects and any objects associated with the plurality of entity objects are validated.

71. The method of claim 67 wherein the step of printing the plurality of entity objects includes the steps of:

(1) printing a first entity object;

(2) the printing of the first entity object causing the printing of a plurality of objects that are contained within the first entity object; and (3) the printing of a selected one of the plurality of objects causing the printing of any objects contained within the selected object until all of the plurality of entity objects and any objects associated with the plurality of entity objects are printed.

72. A program product comprising:

an object oriented framework mechanism for managing fulfillment requirements, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a fulfillment requirements environment that governs the operation of the framework mechanism; and signal bearing media bearing the object oriented framework mechanism.

73. The program product of claim 72 wherein the signal bearing media comprises recordable media.

74. The program product of claim 72 wherein the signal bearing media comprises transmission media.

75. The program product of claim 72 wherein the framework mechanism comprises:

at least one entity object that is part of the at least one fulfillment requirements environment and a first set of object methods to perform a plurality of predetermined functions to implement the fulfillment requirements environment;

at least one availability object corresponding to the at least one entity object and a second set of object methods to determine the availability of the at least one entity object;

at least one relationship object corresponding to a plurality of entity objects and a third set of object methods to determine at least one relationship between the plurality of entity objects;

at least one history object corresponding to the at least one entity object and a fourth set of object methods for determining the history of changes made to the at least one entity object;

at least one description object corresponding to the at least one entity object and a fifth set of object methods for retrieving a description for the at least one entity object;

at least one rule object corresponding to the at least one entity object and a sixth set of object methods for retrieving at least one rule for the at least one entity object; and wherein the object oriented framework mechanism performs the fulfillment requirements according to extended portions of the framework mechanism that are customized to provide a desired fulfillment requirements environment.

76. The program product of claim 72 wherein the framework mechanism further comprises:

at least one object that corresponds to an entity offered to a customer;

at least one object that corresponds to an entity that is ordered that corresponds to the entity offered to the customer; and at least one object that corresponds to an entity that is delivered to the customer that corresponds to the entity offered to the customer and to the entity that is ordered.

* * * * *